US007617511B2

(12) United States Patent
Marsh

(10) Patent No.: US 7,617,511 B2
(45) Date of Patent: Nov. 10, 2009

(54) ENTERING PROGRAMMING PREFERENCES WHILE BROWSING AN ELECTRONIC PROGRAMMING GUIDE

(75) Inventor: David J. Marsh, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1175 days.

(21) Appl. No.: 10/160,919

(22) Filed: May 31, 2002

(65) Prior Publication Data

US 2003/0226145 A1 Dec. 4, 2003

(51) Int. Cl.
*G06F 3/00* (2006.01)
(52) U.S. Cl. .......................................... 725/45; 725/46
(58) Field of Classification Search ................... 725/45, 725/46
See application file for complete search history.

(56) References Cited

U.S. PATENT DOCUMENTS

| | | | |
|---|---|---|---|
| 4,706,121 A | 11/1987 | Young | |
| 5,844,620 A | 12/1998 | Coleman et al. | |
| 5,969,748 A | 10/1999 | Casement et al. | |
| 5,973,683 A | 10/1999 | Cragun et al. | |
| 5,995,133 A | 11/1999 | Kim | |
| 6,005,597 A | 12/1999 | Barrett et al. | |
| 6,115,057 A | 9/2000 | Kwoh et al. | |
| 6,157,411 A | 12/2000 | Williams et al. | |
| 6,317,885 B1 | 11/2001 | Fries | |
| 6,457,010 B1* | 9/2002 | Eldering et al. | 707/10 |
| 6,614,987 B1* | 9/2003 | Ismail et al. | 386/83 |
| 6,651,253 B2 | 11/2003 | Dudkiewicz et al. | |
| 6,698,020 B1 | 2/2004 | Zigmond et al. | |
| 6,704,491 B1 | 3/2004 | Revis | |
| 6,704,931 B1 | 3/2004 | Schaffer et al. | |
| 6,851,090 B1 | 2/2005 | Gutta et al. | |
| 6,973,665 B2* | 12/2005 | Dudkiewicz et al. | 725/46 |
| 6,990,677 B1 | 1/2006 | Pietraszak et al. | |
| 7,185,355 B1* | 2/2007 | Ellis et al. | 725/46 |
| 7,246,128 B2 | 7/2007 | Jordahl | |
| 2001/0021995 A1 | 9/2001 | Hatano | |
| 2001/0041980 A1 | 11/2001 | Howard et al. | |

(Continued)

FOREIGN PATENT DOCUMENTS

JP 2000067060 3/2000

(Continued)

OTHER PUBLICATIONS

U.S. Appl. No. 11/119,170, filed Apr. 29, 2005, Marsh, David.

(Continued)

*Primary Examiner*—Brian T Pendleton
*Assistant Examiner*—Olugbenga O Idowu
(74) *Attorney, Agent, or Firm*—Lee & Hayes, PLLC

(57) ABSTRACT

Systems and methods are described for entering user preference for particular program attribute values while a user is browsing an electronic programming guide (EPG). When a program description is highlighted on the EPG, a preference control invokes a preference entry page when activated. The preference entry page contains several program attribute values associated with the highlighted program. A user can enter new preference ratings or modify previously saved preference ratings for one or more program attribute values on the preference entry page. The user is thus provided with the convenience of entering programming preferences at a time when such preferences are fresh on the user's mind.

51 Claims, 10 Drawing Sheets

U.S. PATENT DOCUMENTS

| | | | |
|---|---|---|---|
| 2002/0042923 | A1 | 4/2002 | Asmussen et al. |
| 2002/0059603 | A1* | 5/2002 | Kelts .......................... 725/47 |
| 2002/0073008 | A1 | 6/2002 | Dutta et al. |
| 2002/0104087 | A1* | 8/2002 | Schaffer et al. ............... 725/46 |
| 2002/0140719 | A1 | 10/2002 | Amir et al. |
| 2002/0144262 | A1 | 10/2002 | Plotnick et al. |
| 2002/0147984 | A1* | 10/2002 | Tomsen et al. .............. 725/109 |
| 2002/0152463 | A1 | 10/2002 | Dudkiewicz |
| 2003/0023537 | A1 | 1/2003 | Joshi et al. |
| 2003/0066077 | A1 | 4/2003 | Gutta et al. |
| 2003/0093694 | A1 | 5/2003 | Medvinsky et al. |
| 2003/0093793 | A1 | 5/2003 | Gutta |
| 2003/0131355 | A1 | 7/2003 | Berenson et al. |
| 2003/0135857 | A1 | 7/2003 | Pendakur et al. |
| 2003/0144922 | A1 | 7/2003 | Schrantz |
| 2004/0041980 | A1 | 3/2004 | Laguette et al. |
| 2005/0004978 | A1 | 1/2005 | Reed et al. |
| 2005/0028194 | A1 | 2/2005 | Elenbaas et al. |
| 2005/0172318 | A1 | 8/2005 | Dudkiewicz et al. |
| 2005/0192987 | A1 | 9/2005 | Marsh |
| 2005/0210502 | A1 | 9/2005 | Flickinger et al. |
| 2006/0190966 | A1* | 8/2006 | McKissick et al. ............ 725/61 |
| 2006/0271958 | A1 | 11/2006 | Ukai et al. |

FOREIGN PATENT DOCUMENTS

| | | |
|---|---|---|
| JP | 2001134582 | 5/2001 |
| WO | WO0040026 | 7/2000 |
| WO | WO0147257 | 6/2001 |
| WO | WO0211445 | 2/2002 |

OTHER PUBLICATIONS

Adami, et al., "The ToCAI Description Scheme For Indexing And Retrieval Of Multimedia Documents", Multimedia Tools And Applications, 14, 153-173, 2001.

De Jong, et al., "Die technische Fachzeitschrift fur Fernsehen, Film und elektronische Medien", Fernseh-Und Kino-Technik- 55, Jahrgang, Nr. Aug.-Sep. 2001, 10 pages.

Evain, "TV-Anytime Metadata, A Preliminary Specification On Schedule", EBU Technical Review, Sep. 2000, 14 pages, EBU Technical Department.

Herla, Von Siegbert, "Online-Archive-MIT Metadaten Zum Erfolg", Dec. 15, 2000, 8 pages.

Jasinschi, et al., "Automatic TV Program Genre Classification Based on Audio Patterns", IEEE 2001, 6 pages, Philips Research, Scarborough Road, Briarcliff Manor, NY, 10510, USA.

Joung, "A Metadata Repository System For An Efficient Description Of Visual Multimedia Documents", Concurrent Engineering, Research and Applications, vol. 9, No. 2, Jun. 2001, 12 pages.

Liu, et al., "Classifying Video Documents by Hierarchical Structure Of Video Contents", The Computer Journal, vol. 43, No. 5, 2000, 15 pages.

McDonald, et al., "Online Television Library: Organisation and Content Browsing for General Users", Proceedings of SPIE, vol. 4315, 2001, 9 pages.

Mulder, "The Integration Of Metadata from Production To Consumer", EBU Technical Review, Sep. 2000, 5 pages.

Taskiran, et al., "Discovering Video Structure Using The Psuedo-Semantic Trace", Proceedings of SPIE, vol. 4315, 2001, 8 pages.

Truong, et al., "Automatic Genre Identification for Content-Based Video Categorization", IEEE, 2000, 4 pages.

Wei, et al., "TV Program Classification Based on Face and Text Processing", IEEE, 2000, 4 pages; Computer Science Department, Wayne University, Detriot MI, Philips Research, Briarcliff Manor, NY.

"Merriam Websters Collegiate Dictionary Tenth Edition", Merriam Websters, Incorprated, 2001, pp. 3.

* cited by examiner

Updating UPF While Browsing EPG

ENTERING PROGRAMMING PREFERENCES WHILE BROWSING AN ELECTRONIC PROGRAMMING GUIDE

TECHNICAL FIELD

The systems and methods described herein relate to personalizing multimedia programming for particular viewers. More particularly, the system and methods described herein relate to entering user preference ratings while browsing an electronic programming guide.

BACKGROUND

In today's television-watching world with hundreds of television channels, it is extremely hard for viewers to find the television program that they will most enjoy. Current electronic programming guides (EPG) provide a daunting sea of information and it would take several hours to look through it all. Many viewers just look at a few favorite channels to see what's on, but this means that they miss many programs on other channels that they would have enjoyed.

With up to five hundred channels available to many television viewers today, it is too impractical for a user to spend the time necessary to manually search through page after page of program listings to find something the user might want to watch. If the user were to take the time to do a proper job of this, there would be no time left for actual program viewing. In practice, viewers today just look at a few favorite channels out of the hundreds that are available. Unfortunately, this means that they are missing out on many programs they would have enjoyed. Many viewers who do not want to take the time to look at program information guides essentially give up on using an EPG and revert to channel surfing.

What the viewer really wants when they sit down in front of the television after a hard day's work is to see a list of only about ten programs from which to choose, where each of the programs accurately matches with the likes and desires of that particular viewer. These accurate recommendations will have been automatically generated by the system and, in some cases, automatically recorded by the system for viewing at the user's leisure.

There are systems that exist that attempt to produce television programming recommendations but, in practice, most users turn off the feature because the recommendations generated do not accurately match with what the viewer really wants to watch. An automatic system that does not work properly is more of an annoyance than help. If the recommendations can be made accurately, then they will be very useful to viewers.

SUMMARY

Systems and methods are described for entering user preference ratings while browsing an electronic programming guide (EPG). The user preference ratings are used in systems and in methods that accurately score and recommend multimedia content programming to users based upon a user's preferences so that each user receives individualized programming recommendations according to the user's likes and dislikes. Entering the user preferences by way of user preference ratings allows a system to identify attributes and attribute values in programs offered, for example, in an upcoming programming schedule that the user is likely to prefer over other programming.

An initial task in automatically finding the television programs is to inform a system as to what types of programs a particular viewer likes to watch. In the described implementation, program attribute values that a user enjoys in a program are stored in a User Preference File (UPF) associated with the user. A user preference rating entered by the user indicates a user's preference for particular program attribute values.

In one implementation, a user enters user preference ratings as the user browses an EPG. While not browsing particular programs, a user may find it hard to remember why the user likes or dislikes one or more particular shows. By allowing the user to enter user preference values while the user is in the process of making a viewing selection, then it is easier for the user to accurately enter preference information. As a result, the recommendations made to the user are more accurate.

If, while browsing the EPG, the user finds a program that the user likes or dislikes for various reasons, the user can enter user preference ratings about attribute values of the program, such as the actors' names, a director name, a description, a title, etc. In this sense, the user is able to use data that is provided via the EPG to assist the user in adding preference ratings for a particular show.

In addition to establishing user preferences, upcoming programs that are available to users must be compared against each user's preferences to determine which programs best match the preferences. In one implementation, this is accomplished by comparing content description files associated with available programs to a user's UPF. Such content description files (CDF) include program attribute values in the form of a specially designed schema. The values of the attributes in the UPF, by being arranged in the same schema as the CDFs, can easily be compared and matches can be identified between the two files.

When a match is found between a program attribute value contained in a CDF and a preference attribute value contained in a UPF, a relative value, or score, of that match is determined. This is accomplished using the user preference ratings for the preference attribute values in the UPF. Additionally, a significance rating that denotes a relative importance of an attribute with regard to other attributes is used to weight the scores for the matches.

The user preference rating denotes how much a user values a particular attribute in a program. For example, a user who likes mysteries might assign a user preference value of positive five (+5) to a mystery attribute. Likewise, if the user dislikes reality shows, the user might assign a user preference value of negative five (−5) to a reality show attribute.

The significance values denote a relative importance between attributes and typically may be stored in a separate file from the UPF. For example, an attribute that designates a particular actor might have a higher significance value than an attribute that designates whether a program has stereo or surround sound.

When a match is found between a CDF attribute value and a UPF attribute value, an attribute score is derived by multiplying the user preference rating for the attribute by the significance value for the attribute. A program score associated with a program is derived by adding the attribute scores attained derived with regard to the program.

When each available program has been assigned a score, programs are recommended to a user. In one implementation, recommended programs are recorded so that the user may view them at any later time. Programs that attain program scores greater than a predetermined threshold score may qualify for recommendation if disk space is not at a premium.

Available storage space may be taken into account when determine which programs to recommend or record. If a program score is greater than the threshold score and there is storage space available in a content buffer (to store either the program itself or the program description or both), then the program is stored. If a program score is greater than the threshold score and there is no available storage space, the program score is compared to program scores of programs already stored in the program buffer. If the program score is higher than one or more program scores of programs stored in the program buffer, then the lowest scored program or programs in the program buffer is/are deleted and the new program is stored.

A major advantage of the systems and methods described herein concerns a user's privacy. All preference data related to a user is contained on the client and no such information is sent to the server. Additionally, in one implementation, a user can have more than one user preference file (UPF) to help guard privacy. Also, a user is always able to view and edit the content of the user's particular one or more UPFs.

BRIEF DESCRIPTION OF THE DRAWINGS

A more complete understanding of exemplary methods and arrangements may be had by reference to the following detailed description when taken in conjunction with the accompanying drawings wherein.

DETAILED DESCRIPTION

The following discussion concerns systems and methods for scoring and recommending television programming and/or multimedia content to a user based on the user's preferences. A user preference file (UPF) is constructed and maintained to store a user's viewing preferences. The UPF is constructed according to a schema by which the available programming is described in one or more content description files (CDF). A CDF for an available program is compared to the user's UPF. Any matches between the two files are scored to derive a program score. If the program score is greater than a predefined threshold, then the program is a candidate for recommendation to the user.

Exemplary Environment

Figure 1:
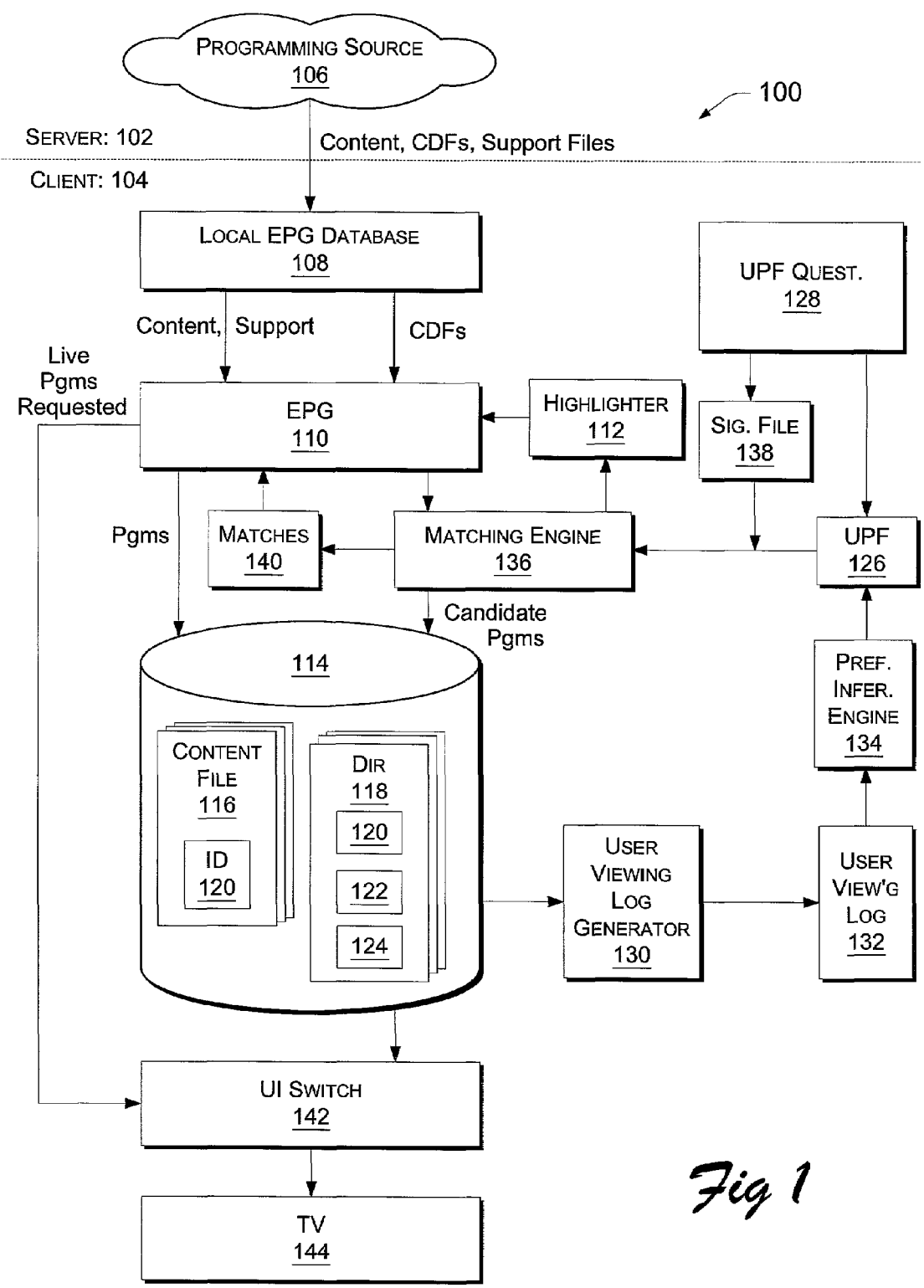
FIG. 1 is a block diagram of an architecture in which a user preference recommendation system can be implemented.

FIG. 1 is a block diagram depicting a user preference recommendation system environment 100 (hereinafter "environment") for scoring programs available for viewing according to a user's preferences and recommending certain programs that meet one or particular conditions. The environment 100 includes a server 102 and a client 104, although there may be several clients (not shown) connected to the server 102 via a network (not shown) such as the Internet. The server 102 includes a content programming source 106 that transmits content programs to the client 104. The content programs may be transmitted according to any suitable protocol known in the art.

The client 104 includes a local electronic programming guide (EPG) database 108 that stores content files, support files and content description files associated with the content files that are downloaded from the programming source 102. The EPG database 108 provides data to an electronic programming guide (EPG) 110. The EPG 110 is similar to those known in the art in that it displays program names, dates, times, lengths, etc. in a grid-like user interface. However, as will be discussed below, the EPG 110 and the information available via the EPG 110 is unique in several respects. A highlighter 112, highlights particular programs displayed on the EPG 110, the highlighter 112 being a function of a viewer's likes and dislikes.

The client 104 also includes a content buffer 114 that stores at least one content file 116 that contains a multimedia program, such as a television program. Each content file 116 has a directory 118 associated with it by means of a content identifier 120. The content identifier 120 is a value that uniquely identifies the content file 116 and its associated directory 118.

In one implementation, the content identifier 120 is a MICROSOFT Content Identifier (MCID). The MCID is a structured numbering scheme able to separately identify the series, episode, version and broadcast part of a content file or transmission. Significant software is involved in the number allocation process to ensure that the same number is used to identify repeated content and to ensure that individual program episodes are correctly grouped into a series in which they belong.

Each directory 118 stores a content description file (CDF) 122 that describes content contained in the content file 116 associated with the directory 118. The content description file conforms to a content description schema that standardizes content descriptions. The directory 118 may also store one or more support files 124 that contain data that may be required by the content file 116 such as artwork or the like.

The client 104 includes a user preference file (UPF) 126 that is associated with a user of the client 104. The client 104 may contain more than one UPF 126 for each user and/or one or more UPFs 126 for each of one or more other users.

The UPF 126 stores values for attributes of multimedia content, such as television programs, each attribute value having a preference value associated with it that indicates how much the user associated with the UPF 126 likes or dislikes that particular attribute value in a program. The UPF 126 also conforms to the content description schema that is used in the CDF 122 to describe content.

The UPF 126 is an important element that allows separation of the process of establishing user preference from the process of matching the user preferences with programs that are available for viewing. The UPF 126 provides the decoupling of the processes.

There are various techniques that can be used to populate the UPF 126 with useful information, i.e., information about what attribute values of television programs are liked and which are specifically disliked. One way to produce a UPF 126 is to provide the user with a UPF questionnaire 128 and ask the user directly about what attribute values are important to the user.

After the UPF 126 is initially constructed, the UPF 126 is periodically updated with new information about preferred program attribute values. In one implementation, the user may recall the UPF questionnaire 128 and add additional information. Also, the UPF 126 is preferably an editable file that a user may access to edit entries, or attributes.

A more advanced technique is described that provides a user viewing log generator 130 that monitors programs watched (or listed to or otherwise consumed) by the user. Program attribute values associated with the monitored programs together with the time for which each attribute was viewed are logged in a user viewing log 132. At predetermined intervals, a preference inference engine 134 builds up the UPF 126 using information contained in the user viewing log 132.

For example, the user viewing log generator 130 may log a program only if the program is watched for a certain amount of time, such as for twenty minutes. After that time, the user viewing log generator 130 may consider the program significant and log program attribute values of the program, such as the genre of the program, the actors starring in the program, the program title, etc. The preference inference engine 134 analyzes the data collected in the user viewing log 132 and determines which information should be used to update the UPF 126 as preferred attribute values.

As previously mentioned, in one implementation, the preference inference engine 134 periodically updates the UPF 126 at predefined intervals. In another implementation, the preference inference engine 134 updates the UPF 126 when a certain amount of data has been collected in the user viewing log. This way, if the user's viewing habits are such that an unusually large amount of data is logged in a short period of time, the data can be parsed and integrated into the UPF 126 before the size of the data becomes large and unwieldy. The resources required by the preference inference engine should not be so great as to draw essential resources for presenting the programs to the user.

In the present implementation, both techniques described above are used. The UPF questionnaire 128 is initially used to create the UPF 126. Thereafter, the preference inference engine 134 continually enriches the information stored in the UPF 126. As more detail is accumulated in the UPF 126, recommendations made based on the UPF 126 will be more accurate, i.e., the recommendations provided to the user will more closely satisfy the user's preferences.

The client 104 also includes a matching engine 136 that drives the comparison of a UPF with content description files associated with programs that are available for viewing. When the matching engine 136 determines that an attribute value in the UPF 126 matches an attribute value found in a CDF 116, the matching engine 136 calculates an attribute score for the matching attribute, i.e., the attribute that has matching values in the UPF 126 and the CDF 116. For example, an "actor" attribute in the UPF 126 may contain a value of "Steve Martin." If an "actor" attribute in the CDF 116 also contains the value of "Steve Martin," then the "actor" attribute is referred to herein as a matching attribute. An attribute score may then be assigned to the matching attribute and one or more attribute scores assigned in a program are used to calculate a program score for the program. In one implementation, significance values included in a significance file 138 are utilized in the calculation of program scores. Programs may then be recommended to users based on program scores associated with the programs. Attribute scores and program scores will be discussed in greater detail below, in the discussion of FIGS. 2-4, which further describes the UPF 126, the CDF 116, the significance file 138 and the content description schema utilized therein.

A matches file 140 is used to store matching attribute values and corresponding preference ratings associated therewith. Further description of the matches file 140 is found below, with regard to the discussion of FIG. 10.

The client 104 also includes a user interface (UI) switch 142 and a television 144. Although shown as being a part of the client 104 in this example, it is noted that the television 144 may be separate from the client 104, such as in the case where the client 104 is embodied in a set top box (STB). The UI switch 142 is used to switch between stored programs in the content buffer 114 and live programs emanating from the content source 106.

Content Description Schema

In order to match the attribute values that the user likes with the attribute values of the content programs (e.g., movies, television programs, audio programs, etc.), the content is described in a comprehensive and consistent way. In one implementation, content is described according to a content description schema that includes metadata categories corresponding to content attributes. The content description schema used herein is similar to the content description schema described in U.S. patent application Ser. No. 10/125,260 entitled "Media Content Description" by David J. Marsh, filed Apr. 16, 2002 and assigned to the MICROSOFT CORP., the assignee of the present invention. That patent application is incorporated herein by reference.

The content description schema used herein is also similar to the content description schema described in U.S. patent application Ser. No. 10/160,932, entitled, "Scoring And Recommending Television Programming Based On User Preferences" by David J. Marsh, filed contemporaneously herewith (May 31, 2002) and assigned to the MICROSOFT CORP, the assignee of the present invention. That patent also describes systems and methods for scoring multimedia programs and recommending some of the programs based on the scores, such as is described herein. That patent application is also incorporated herein by reference.

User Preference File

Figure 2:
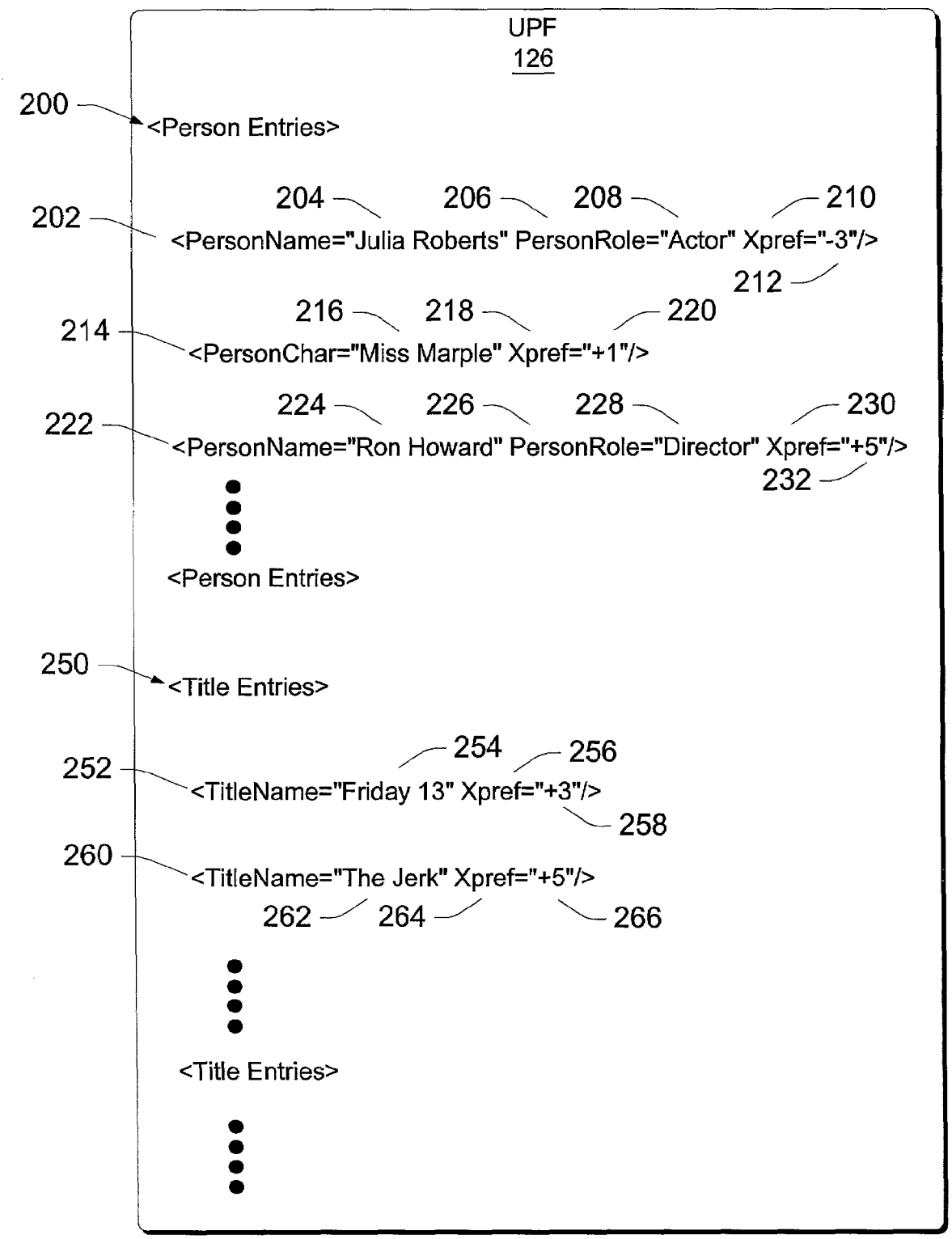
FIG. 2 is a representation of an example of a user preference file with attributes and attribute values.

FIG. 2 is a representation of an example of the content description schema as used in the user preference file 126. The example contains an abbreviated selection of attributes and attribute values, and it is noted that there may be more entries than shown and/or different attributes and/or attribute values than shown in FIG. 2.

Preferably, the UPF 126 is written in terms of the same metadata attributes, i.e., categories, that are used to describe the content on offer in upcoming multimedia programs, described here as being contained in the CDF 122. A separate but compatible schema could be used for the UPF 126 and the CDF 122, but as a content description schema is an evolving concept with additional metadata categories being added over time, it is hard to keep separate schemas in synchronization with each other. A better approach is to architect the content description schema so that the same schema can be used for both the content description file and the user preference file, as is described herein.

To facilitate the inclusion of the content description schema within the UPF schema and to ensure the two remain in synch, certain 'user preference' attributes are added to the content description schema that is defined in the previously incorporated application. One added attribute is a user preference rating that a user assigns to a particular metadata entry. Another added attribute is a significance value that denotes a relative importance of the attribute to which it corresponds. These attributes will be discussed in greater detail below.

The UPF 126 includes a section having a "Person Entries" heading 200 and a section having a "Title Entries" heading 250. The "Person Entries" 200 heading includes a "Person Name" attribute 202 that is used to identify an actor preferred by a user. A Person Name attribute value 204 contains an actor's name, "Julia Roberts." This indicates that the user corresponding to the UPF 126 has a preference—liking or disliking—for Julia Roberts starring in a program.

A "Person Role" attribute 206 is included to identify a particular function that the person identified in the Person Name attribute value 204 performs in the program. This allows a user to distinguish between actors who may also be a director in some programs. For example, the user may like movies that Clint Eastwood stars in but not movies that Clint Eastwood directs. In the present example, the "Person Role" attribute 206 has a Person Role attribute value 208 that indicates that the user is referring—in this entry—to Julia Roberts as an actor and not as a director, producer, or otherwise A preference attribute 210 is associated with a user preference rating 212 that the user enters to indicate how much, relatively, the user likes or dislikes the values specified in the "Person Name" attribute 202. The preference attribute 210 is an attribute added to the content description schema described in the previously incorporated patent application. The user preference rating 212 in the present example implementation may range from a negative five to a positive five—negative denoting a dislike for an associated attribute, positive denoting a liking of an associated attribute. However, the range of values of the preference value 212 depends on the implementation. In this example, the user preference rating 212 is "−3", which indicates that the user prefers programs in which Julia Roberts does not star.

The UPF 126 also includes a "Person Character" attribute 214, a Person Character attribute value 216 and a preference attribute 218 and user preference rating associated with the "Person Character" attribute 214. The "Person Character" attribute 214 enables a user to identify particular characters that the user likes or dislikes. In the present example, the Person Character attribute value 216 is "Miss Marple" and the user preference rating associated with that character is "+1", which indicates that the user slightly prefers programs in which this character appears.

There may be virtually any number of similar entries under the "Person Entries" heading 200. Also shown in FIG. 2 is a "Person Name" attribute 222 having a Person Name attribute value 224 of "Ron Howard." A Person Role attribute 226 associated with the "Person Name" attribute 222 includes a Person Role attribute value 228 of "Director." A preference attribute 230 has a user preference rating 232 of "+5". This indicates that the user associated with the UPF 126 strongly prefers programs directed by Ron Howard. Note that it does not indicate any preference for programs or movies in which Ron Howard is an actor.

Under the "Title Entries" heading 250 is a "Title Name" attribute 252 having a Title Name attribute value 254 of "Friday 13" associated with it. A preference attribute 256 has a user preference rating 258 of "+2" and thus indicates that the user mildly prefers the "Friday the 13$^{th}$" series of movies.

Whether attribute values actually match or not depends on the particular entry type. In the case of a preference for a movie sound track to be in French, a complete match is looked for. In the case of other element types, a more subtle correspondence between attribute values may constitute a match. In the above example of a title entry, it is not necessary to have a complete match for a match to have been deemed to be present. It is only necessary for the words from the Title Name attribute value 254 in the UPF 126 to appear somewhere in the content title for a match to be triggered. The above example— "Friday 13"—would match with any of the "Friday the 13$^{th}$" series of movies.

The "Title Entries" heading 250 section may contain any number of entries. In the present example, another "Title Name" attribute 260 is included and has a Title Name attribute value 262 of "The Jerk." A preference attribute 264 has a corresponding user preference rating 266 of "+5" indicating that the user really likes that particular movie.

Content Description File

Figure 3:
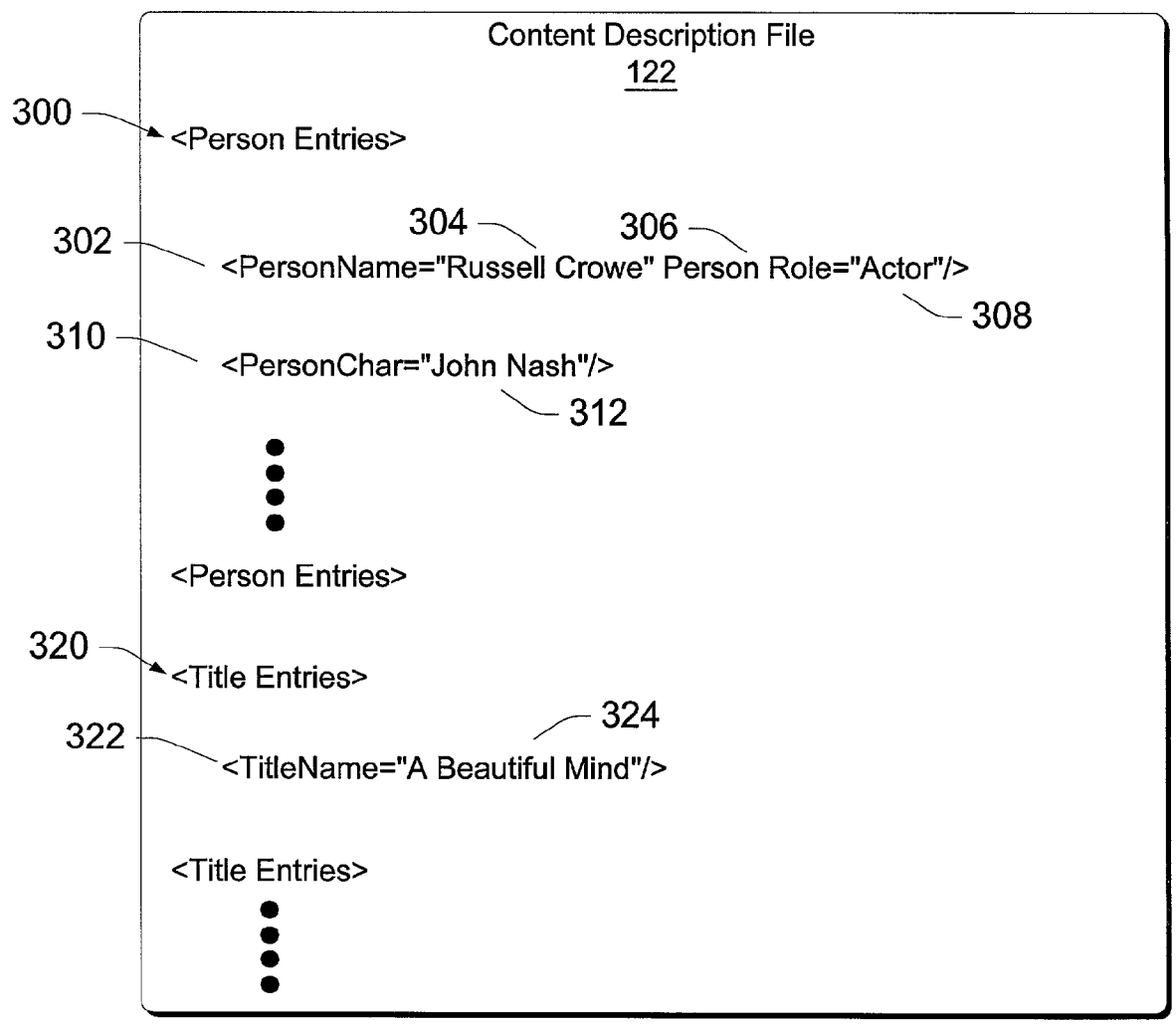
FIG. 3 is a representation of an example of a content description file with attributes and attribute values.

FIG. 3 is a representation of an example of the content description file (CDF) 122 shown and described in FIG. 1. The CDF 122 shown in FIG. 3 is exemplary only and has been simplified for presentation. It is noted that entries or attributes included in the CDF 122 may include more than what is shown in FIG. 3. For example, a title entry may include an entry index, a content identifier, a date of release, a running time, a language, and the like.

The CDF 122 includes "Person Entries" heading 300 and a "Title Entries" heading 320. A "Person Name" attribute 302 under the "Person Entries" heading 300 identifies a person associated with the program that corresponds with the CDF 122. In this example, the "Person Name" attribute 302 is associated with a Person Name attribute value 304 of "Russell Crowe" which indicates that Russell Crowe is associated with the program corresponding to the CDF 122.

A "Person Role" attribute 306 identifies a function performed by the person identifies in the Person Name attribute value 304. Here, a Person Role attribute value 308 associated with the "Person Role" attribute 306 is "Actor" meaning that Russell Crowe is an actor in the described program.

A "Person Character" attribute 310 is used to identify a character in the program described by the CDF 122. In this example, the "Person Character" attribute corresponds with a Person Character attribute value 312 of "John Nash," indicating that one character in the described program is John Nash. It is apparent that a "Person Name" attribute 302 may be present in the CDF 122 for each person associated with the program (e.g., actor, director, producer, etc.). Also, a "Person Character" attribute 310 may be included for each character that appears in the program.

A "Title Name" attribute 322 under the "Title Entries" heading 320 identifies a title of the program associated with the CDF 122. In this example, the "Title Name" attribute 322 contains a Title Name attribute value 324 of "A Beautiful Mind," that being the title of the program.

It can be seen that the UPF 126 and the CDF 122 contain the same—or at least many of the same—attributes. This is due to the fact that the files utilize the same content description schema to describe attributes of programs. This makes the process of matching program attributes with a user's preferred attributes much more straightforward.

Significance File

Figure 4:
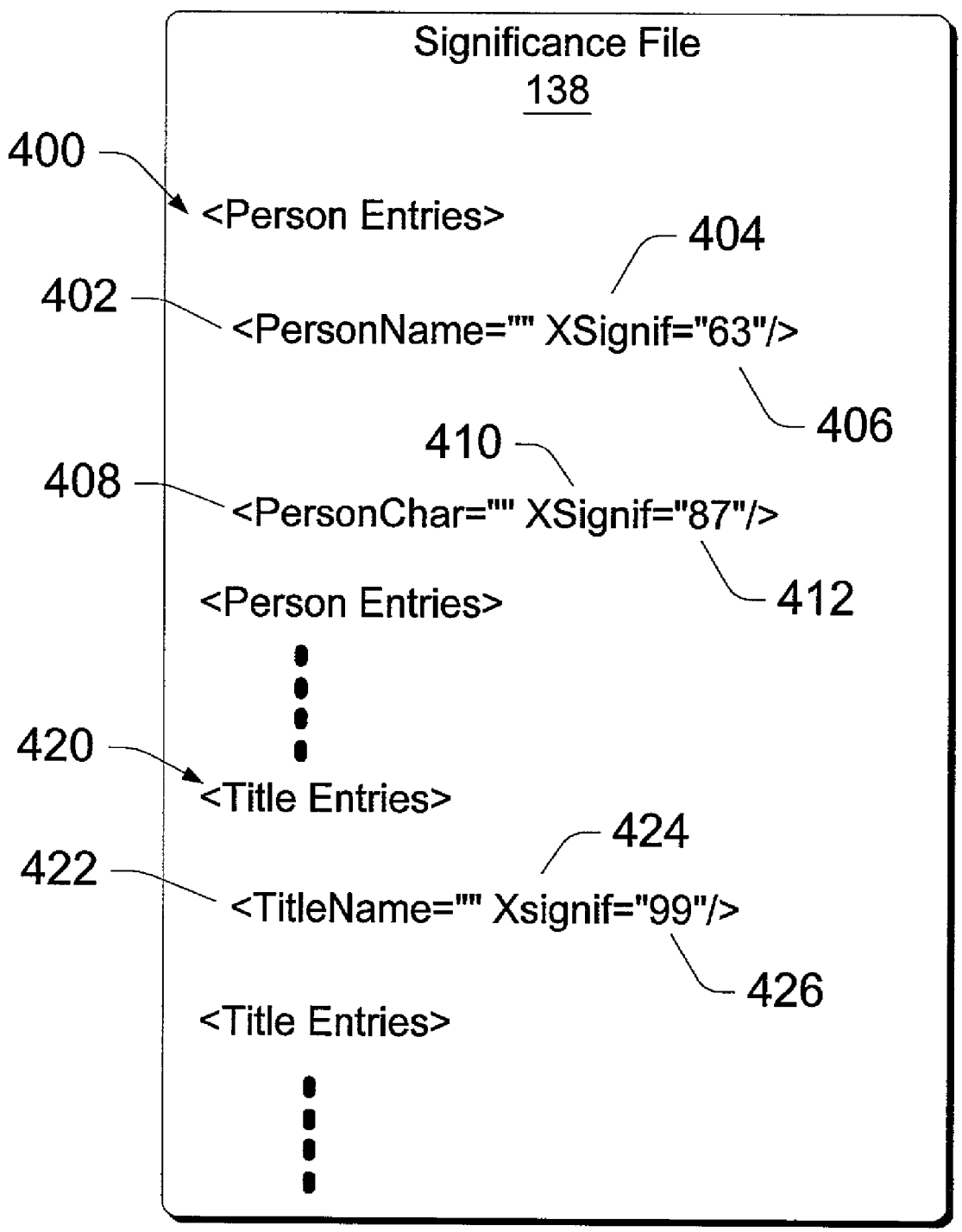
FIG. 4 is a representation of an example of a significance file with attributes and significance values.

FIG. 4 is a representation of an example of the significance file 138 shown in FIG. 1. The significance file 138 is used to stored significance values that correspond to each attribute available in a program. Each significance value denotes a relative importance of the attribute with which it corresponds as compared to the other attributes. Use of the significance values provides an appropriate weighting factor when determining whether a program should be recommended to a user or not.

An example of the use of significance values is that a particular actor starring in a program is more important to a user than whether the program is in surround sound. Although a user may enter a same preference value for a Person Name attribute value and a Surround Sound attribute value (e.g., +5) because the user strongly prefers both, all other things being equal, using the significance file the system would determine that a user would prefer a program having the particular actor and stereo sound to a program without the actor but with surround sound. To appropriate weight this consideration, significance values are assigned to each attribute.

The significance file 138 includes a "Person Entries" heading 400 and a "Title Entries" heading 420. Note that these entries are similar to the entries contained in the UPF 126 and the CDF 122. Also, it should be noted that many other types of entries may be included in the significance file 138, but only a few are shown in this example.

A "Person Name" attribute 402 is included under the "Person Entries" heading 400. Associated with the "Person Name" attribute 402 is a significance attribute 404 that is used to identify the relative importance of a person being associated with a program as compared to other attributes. In this implementation example, a significance value of "63" has been assigned to the "Person Name" attribute 402. If the significance values range from zero to one hundred, a "63" value indicates that it is fairly important to the user that a "Person Name" attribute in the CDF 122 match a "Person Name" attribute in the user's UPF 126. The value range is arbitrary and, of course, must include a range that contains as many elements as there are attributes. It is noted that, in the described implementation, the significance values are global values that apply to all users and/or all systems and, therefore, the significance values are not unique to one particular user.

A "Person Character" attribute 408 is also listed under the "Person Entries" heading 400. The "Person Character" attribute 408 enables a user to rate the significance of a particular character being in a program available for viewing. A significance attribute 410 associated with the "Person Character" attribute 408 contains a significance value 412 of "87." This indicates that the presence of a particular character in a program is very important to the calculation of the program score. As compared to the significance value 406 for the "Person Name" attribute 402, it can be seen that it is more important that a particular character be in a program than it is for a particular person to star in or be otherwise associated with the program.

A "Title Name" attribute 422 is included under the "Title Entries" heading 420. The "Title Name" attribute 422 allows a user to indicate how important it is—as far as program recommendation is concerned—for a program title to match a title stored in the user's UPF 126. In the present example, a significance attribute 424 contains a significance value 426 of "99," indicating that it is very important to a program's recommendation score if the program title matches a title in the user's UPF 126.

It is noted that the significance values could be stored in the UPF 126 along with each entry therein. However, this would require redundant entries since some attributes may be repeated with different attribute values. For example, a UPF 126 may include fifty actors' names that a user prefers to see. If the significance values were included in the UPF 126, then each of the fifty entries for actors' names would have to include the same significance value. Also, it is preferred that the significance file 138 be a system-wide global file that relates to all users.

Furthermore, it is noted that it is not necessary that the user create and/or have control over the significance file. A system designer may assign the significance values for a system. While such an implementation would not provide as close a fit with each user's personal preferences, it would relieve the user from having to do the work himself. Preferably, a system is shipped with default significance values that may be changed by a user.

Exemplary Electronic Programming Guide

Figure 5:
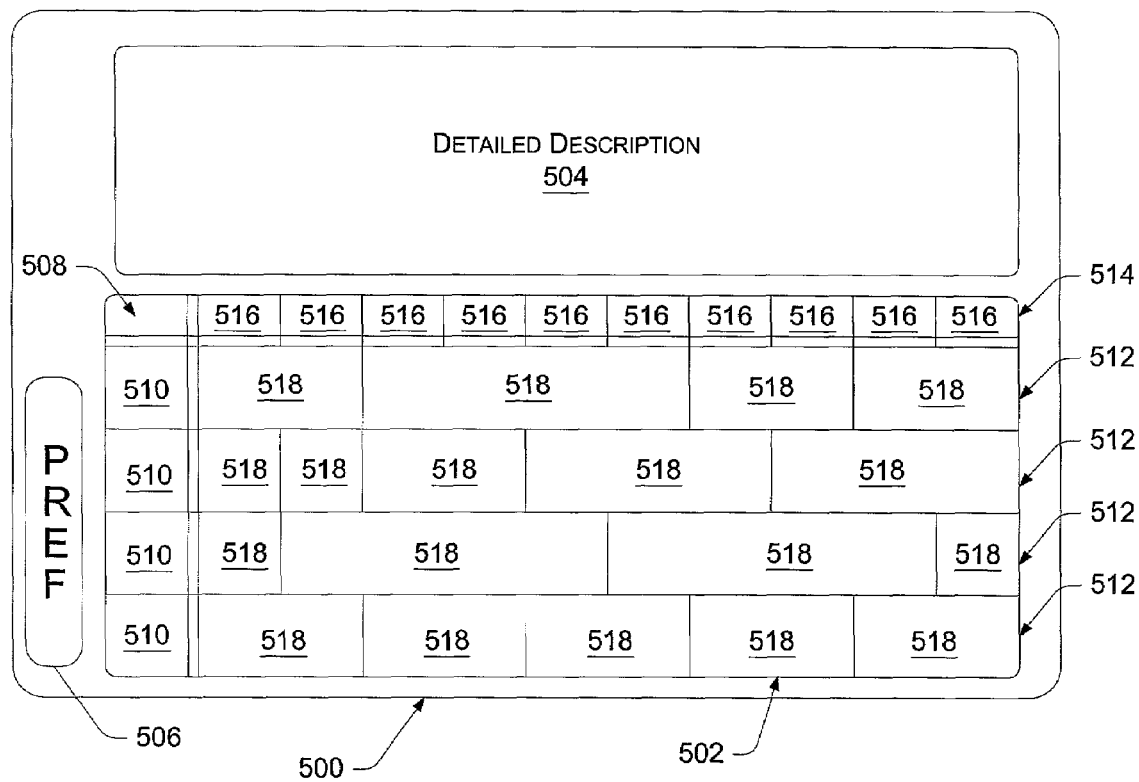
FIG. 5 is an illustration of an exemplary electronic programming guide (EPG).

FIG. 5 is a simplified illustration of an exemplary electronic programming guide (EPG) 500. The EPG 500 includes a program grid 502, a detailed description block 504 and a preference button 506. The program grid 502 is a grid that displays programs by program channel and program time. The program grid 502 includes a channel column 508 that is used to display one or more channels 510 assigned to each row 512 of the program grid 502. The program grid 502 also includes a time row 514 that displays time blocks 516 shown in the program grid. The time blocks 516 typically depict one-half hour time periods. The program grid 502 includes several program blocks 518 that display program titles of programs available for viewing.

The exact layout of the EPG 500 is not critical to the systems and methods described herein. The concept illustrated in FIG. 5 highlights the importance of the inclusion of the preference button 506 in the EPG 500. The preference button 506 is associated with the EPG 500 so that a user, while browsing the EPG 500, may notice a program that the user wants to watch (or hear). During the time that the program is highlighted by the user, the user may actuate the preference button 506, which enables the user to enter user preference ratings that are then associated with the highlighted program.

When the preference button 506 is activated, a preference entry page is displayed with attribute values associated with the highlighted program. The user may then enter user preference ratings that are associated with the displayed attribute values. In this way, the user can enter user preferences while the reasons that the user prefers a certain program are fresh in the user's mind. Also, this technique occurs in process so that the user does not expend an inordinate amount of time on the procedure. The preference entry page and its use will be discussed in greater detail with respect to the following figures.

Exemplary Preference Entry Page Layout

Figure 6:
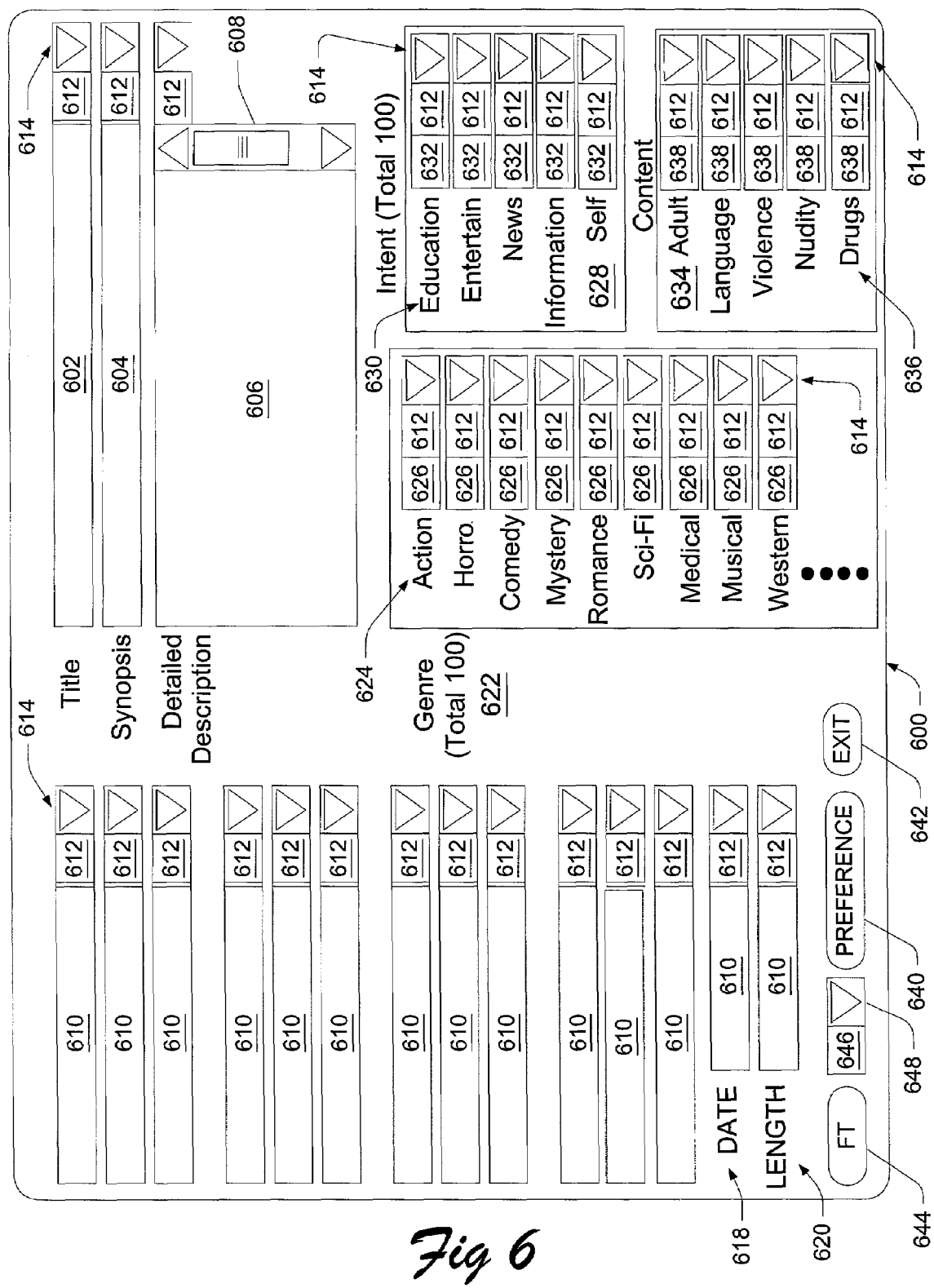
FIG. 6 is an illustration of preference entry page.

FIG. 6 is a simplified illustration of an exemplary preference entry page 600 that is displayed when a user actuates the preference button 506 on the EPG 500 shown in FIG. 5. The preference entry page 600 includes a title 602 of a program associated with the program block 518 that was highlighted when the preference entry page 600 was called up by the user (hereinafter "the highlighted program 518"). A brief synopsis 604 of the highlighted program 518 appears together with a detailed description 606 of the highlighted program 518. A scroll bar 608 appears alongside the detailed description 606 that is used to scroll the detailed description 606 up or down so a longer description can be viewed in its entirety.

Multiple attribute blocks 610 are included in the preference entry page 600, each of which may contain an attribute value associated with the highlighted program 518. For example, an attribute value naming in actor appearing in the highlighted program 518 may appear in an attribute block 610. The attribute blocks 610 may be grouped to describe several related attribute values. In the preference entry page 600, the attribute blocks 610 appear in groups of three attribute blocks. As an example of how a group of three attribute blocks 610 may be used, a first attribute block 610 may contain an attribute value of the name of a person associated with the highlighted program 518, a second attribute block 610 may contain an attribute value of the function of the named person in regard to the highlighted program 518, and a third attribute block 610 may contain an attribute value of a name of a character associated with the person shown in the first attribute block 518. A more concrete example will be discussed in greater detail, below, in the discussion of FIG. 8.

It is noted that a limited amount of attribute value blocks 610 is depicted in FIG. 6. However, there may be more or less attribute value blocks 610 displayed on the preference entry page 600 depending on the specific implementation.

Figure 7:
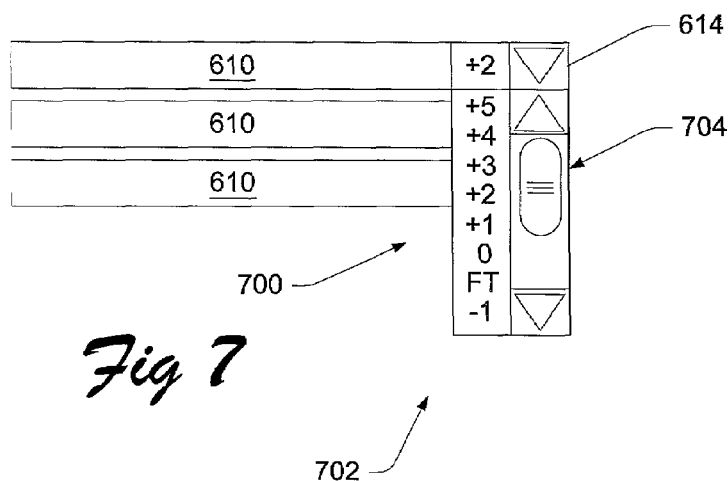
FIG. 7 is an illustration of a rating control used with the preference entry page.

Each attribute block 610 has a preference rating block 612 associated therewith. The preference rating block 612 is used to store, display and enter user preference ratings that the user has or desires to associate with a particular attribute value shown in the corresponding attribute block 610. An entry button 614 is associated with each preference rating block 612, and is actuated to enable entry of a preference rating. For convenience, only one entry button 614 is labeled in FIG. 6, but each entry button 614 shown is similar to the labeled entry button 614. FIG. 7 shows, in greater detail, how preference ratings may be entered when an entry button 614 is actuated. In the discussion of FIG. 7, continuing reference will be made to the elements and reference numerals shown in FIG. 6.

FIG. 7 is a more detailed illustration of a rating control 700 that may be used with the preference entry page 600 to enter preference ratings into the preference rating blocks 612. The rating control 700 features a ratings list 702 that includes all the ratings available to insert into the preference rating block 612. In the example shown in FIG. 7, the preference ratings range from negative five (−5) to positive (+5) plus a value of "FT" that will be explained below.

The rating control 700 also includes a scroll bar 704 that is used to scroll up or down so that all the available ratings may be displayed. If the available ratings can all be displayed at the same time, there is no need to include the scroll bar 704.

When a user desires to enter a preference rating for an attribute value shown in an attribute block 610, the user actuates the entry button 614 associated with the attribute block 610. When the entry button 614 is actuated, the rating control 700 is displayed so that the user may then select an available rating that the user wishes to enter into the preference rating block 612 associated with the entry button 614 and the attribute block 610. When a preference rating is selected from the ratings list 702, the rating control 700 disappears and the selected rating appears in the preference rating block 612.

Referring back to FIG. 6, the preference entry page 600 further includes an attribute block 610, a preference rating block 612 and an entry button 614 that are associated with a date 618 associated with the highlighted program 518. Also, an attribute block 610, a preference rating block 612 and an entry button 614 are associated with a length 620 of the highlighted program 518. The user is thus enabled to enter preferences for a date 618 when a program was released and/or a run-time length 620 of a program. So if a user prefers movies released in the 1930's, the user can identify that preference. Likewise, if the user dislikes programs than run longer than 3 hours, the user can identify that preference.

The title 602, synopsis 604 and detailed description 606 all have preference entry blocks 612 associated with them. In one implementation, a user selects portions of the title 602, synopsis 604 and detailed description 606 that the user wants to enter a preference rating for and enters a preference rating in the corresponding preference rating block 612. The selected text from the title 602, synopsis 604 and detailed description 606 will then be saved and associated with the preference rating entered by the user. In this way, the entire text of the descriptive entries does not need to be saved. By allowing a user to identify only the text portions that apply to the user's preference, the user is ensured that recommendations of future programs will be more accurate.

The preference entry page 600 also includes a genre block 622 that identifies several genre attribute values 624 for which a user may enter a preference. In the preference entry page 600 shown, genre attribute values 624 include action, comedy, horror, mystery, romance, science fiction, medical, musical and western. The genre attribute values 624 shown are exemplary only, and may include other values, such as adventure, death, police, thriller, politics, erotica, period setting, sports, animals, legal, religious, historical, war, epic, fantasy, teenage, ethnic interest, soap opera, and so on. Although not shown, a scroll control may be used with the genre rating block 602 to allow scrolling through the genre attribute values 624.

Each of the genre attribute values 624 is associated with a genre rating block 626 that identifies a genre rating associated with the genre attribute value 624. In the present implementation, the genre ratings displayed in the genre rating block 626 total one hundred (100) points. The genre ratings displayed in the genre rating block 626 is a relative rating that identifies how closely the highlighted program 518 is described by the genre attribute value 624 that corresponds with a particular genre rating block 626. For example, if a movie is mostly seen as being a comedy, but also includes romantic aspects, the movie may include a genre rating of ninety (90) displayed in the genre rating block 626 that corresponds with the genre attribute value 624 of "Comedy." The movie may also include a genre rating of ten (10) displayed in the genre rating block 626 that corresponds with the genre attribute value 624 of "Romance."

Each genre rating block 626 corresponds with a preference rating block 612 that allows a user to enter a user preference for a genre degree shown in a genre rating block 626. In the example cited above, if a user really enjoys programs that include a genre degree of ninety (90) for "Comedy," then the user can indicate that preference by assigning a high user preference rating in the preference rating block 612 that corresponds with the genre rating block 626 associated with "Comedy." The matching engine 136 does not need an absolute match between a 'Degree Of' specified in the User Preference File 126 and a 'Degree Of' specified in the Content Description File 126, but rather it looks to see which of the 'Degrees Of' categories have the highest values and matches this between the two files.

As with other features shown and described in the preference entry page 600, an entry button 614 is associated with each preference rating block 612 in the genre rating block 622. The entry buttons 614 provide a mechanism by which the user enters preference ratings in the preference rating blocks 612 of the genre rating block 622.

The preference entry page 600 also includes an intent block 628 that identifies one or more intentions of the highlighted program 518. For example, if the highlighted program 518 intends to provide an educational program, then that intent will be indicated in the intent block 628.

The intent block 628 includes several intent attribute values 630 including education, entertainment, news, information and self-enrichment. Other similar types of intent attributes may also be included. Although not shown, a scroll control may be used with the intent block 628 if scrolling is required to view all the available intent attribute values 630.

An intent rating block 632 is associated with each intent attribute value 630 and is used to identify an intent value associated with the corresponding intent attribute value 630. In the present implementation, the intent rating displayed in the intent rating blocks 632 total one hundred (100) points. The degree of intent displayed in the intent rating block 632 is a relative rating that identifies how closely the highlighted program 518 is described by the intent attribute value 630 that corresponds with a particular intent rating block 632.

For example, a documentary on the subject of World War II may include a degree of intent of '50' displayed in the intent rating block 632 that corresponds with the intent attribute value 630 of "Education." Furthermore, the documentary may also include a degree of intent of "25" displayed in each of the intent rating blocks 632 that correspond with the intent attribute values 630 of "News" and "Information."

As with other features shown and described in the preference entry page 600, an entry button 614 is associated with each intent rating block 632 in the intent block 628. The entry buttons 614 provide a mechanism by which the user enters preference ratings in the preference rating blocks 612 of the intent block 628.

The preference entry page 600 also includes a content block 634 that identifies one or more adverse contents of the highlighted program 518. For example, if the highlighted program 518 is a war movie with intense battle scenes, then an indication that the highlighted program 518 contains violent content will be shown in the content block 634.

The content block 634 includes several content attribute values 636 including adult content, language, violence, nudity and drugs, although other content attribute values may be included. Although not shown, a scroll control may be used with the content block 634 if scrolling is required to view all the available content attribute values 636.

A content rating block 638 is associated with each content attribute value 636 and is used to identify a content rating associated with the corresponding content attribute value 636. In the present implementation, the content rating displayed in the content rating blocks 638 total one hundred (100) points. The content degree displayed in the content rating block 638 is a relative rating that identifies how closely the highlighted program 518 is described by the content attribute value 636 that corresponds with a particular content rating block 638.

Using the example provided above wherein a program contains explicit battle scenes, a content attribute value 636 of "Violence" may indicate a content degree of "100." If there is also adult language in the program, the "Violence" content attribute 636 may include a content degree of "50" and a content attribute value 636 of "Language" may also indicate a content degree of "100." These numbers may, of course, vary depending on the amount of explicit violence or language actually contained in the program.

As with other features shown and described in the preference entry page 600, an entry button 614 is associated with each content rating block 638 in the content block 634. The entry buttons 614 provide a mechanism by which the user enters preference ratings in the preference rating blocks 612 of the content block 634.

A set preference actuator 640 and an exit actuator 642 are also included in the preference entry page 600. The set preference actuator 640 is used to save user-entered values after they are entered, when the user is certain that she wants the newly entered values to remain stored until changed. The exit actuator 642 is used to exit the preference entry page 600 without saving any newly entered values.

For example, a user may change a preference rating in one or more preference rating blocks 612. If the user changes her mind about the newly entered value(s), then she can actuate the exit actuator 642 to return to the EPG without saving any changes. If the user decides that she wants the changes to be stored permanently (i.e., at least until she changes them again), then the user may actuate the set preference actuator 640 to save the changes. After the set preference actuator 640 is actuated, the user may continue to view the preference entry page 600 and add, remove or modify values if she wants. To save changes and then exit, the user would actuate the set preference actuator 640 before actuating the exit actuator 642.

In one implementation, values entered are rendered in a different color than the values already stored. For example, if the preference entry page 600 includes an attribute value of "John Wayne" in an attribute value block 610 and the user has previously stored a preference rating of "+3" in the preference rating block 612 associated with the attribute value block 610, then the values "John Wayne" and "+3" would be rendered in a first color, such as black.

If the preference rating were changed to "+4," then the new preference rating ("+4") would be displayed in a second color, such as red. When the user actuates the set preference actuator 640, the new preference rating ("+4") would change from red to black. In this way, a user can keep track of values that the user has entered since the last save operation was performed on the preference entry page 600.

The preference entry page 600 also includes a filter token button 644. A filter token feature associated with the filter token button 644 allows a user to do more than just enter simple preferences for single attribute values. A filter token rating 646 and a filter token value entry control 648 are associated with the filter token button 644.

In addition to a preference rating in a range from negative five (−5) to positive five (+5), a user may select a filter token value identified as "FT." The user can assign the "FT" value to a plurality of attribute values. This indicates that all such attributes must be present (i.e., set to 'true') before the global filter token rating 646 applies.

When the matching engine 136 determines that a filter token condition applies and is true, the matching engine 136 calculates an attribute score and, ultimately, a program score using the global filter token rating 646 and the highest significance value associated with the attribute values having a value of "FT."

Exemplary Preference Entry Page With Sample Values

Figure 8:
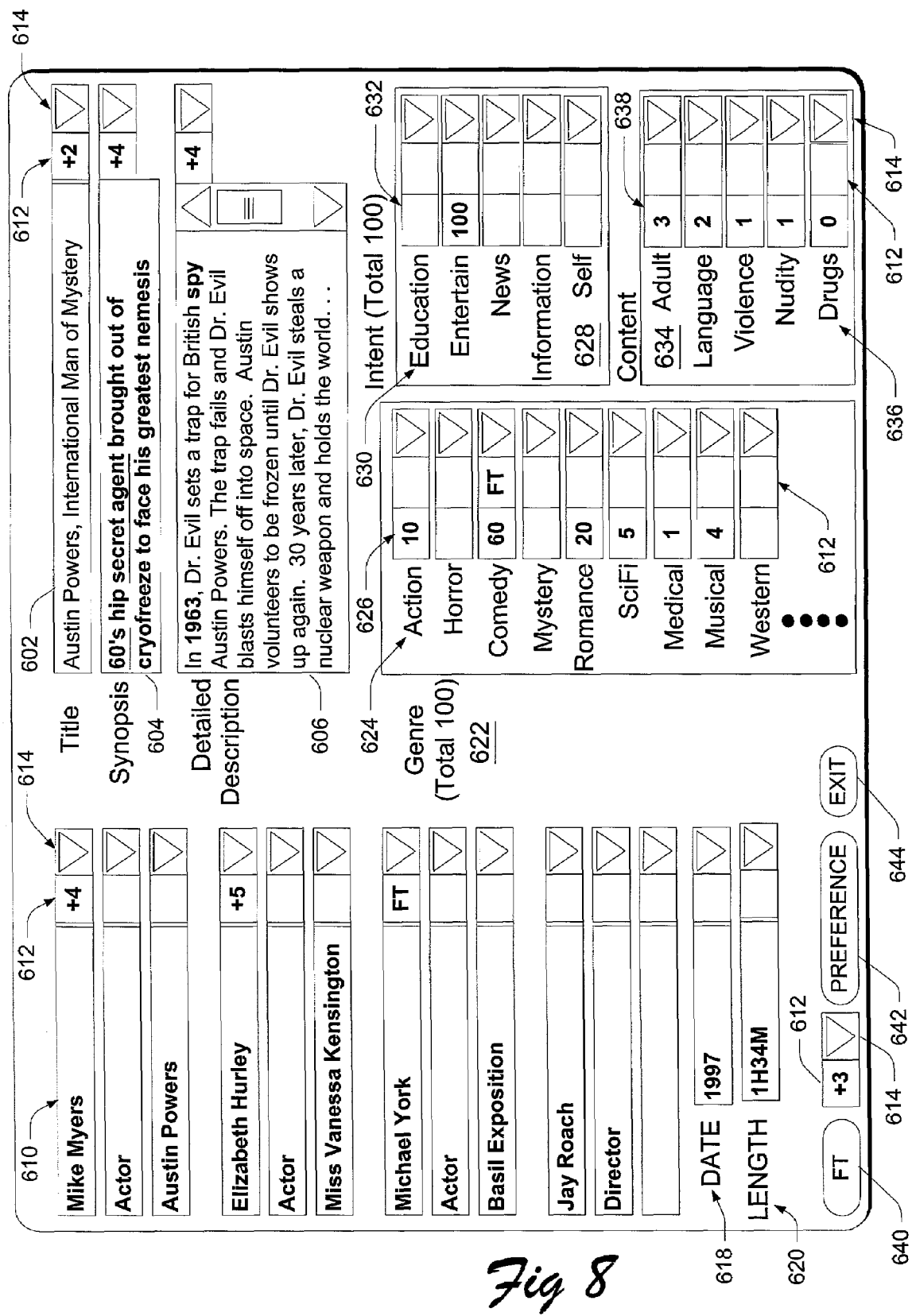
FIG. 8 is an example of a partially completed preference entry page.

FIG. 8 is an exemplary preference entry page as shown in FIG. 6, but at least partially completed with sample values. Reference numerals and elements shown and described in FIG. 6 are used in the discussion of FIG. 8.

As indicated by the title 602, the example shown in FIG. 8 refers to the movie "Austin Powers, International Man of Mystery" (hereinafter "movie"). The synopsis 604 and the detailed description 606 provide different detailed descriptions of the movie. A preference rating of "+2" has been entered and is thus displayed in the preference rating block 612 associated with the title 602. This indicates that the user who entered the preference rating likes this particular movie fairly well.

The synopsis 604 has two terms highlighted, to-wit, "60's" and "secret agent." Also, the preference rating block 612 associated with the synopsis 604 includes a preference rating of "+4." This indicates that the user decidedly prefers programs in which the terms "60's" and/or "secret agent" appear in a synopsis of the programs, depending on the specific implementation.

Similarly, the detailed description 608 has two terms highlighted, namely, "1963" and "spy." A preference rating of "+4" in the preference rating block 612 associated with the detailed description 606 indicates that the user very much prefers programs in which a detailed description of the program contains both of these terms (or, in an alternate implementation, at least one of these terms).

In another implementation not shown, the user may enter preferences in the synopsis 604 and the detailed description 606 by deleting all the terms that the user does not want to attribute to a preference. This is simply excluding unwanted terms instead of including (by underlining, highlighting, bolding, etc.) desired terms.

One attribute value block 610 displays the name of "Mike Myers" and identifies his function in the movie as an actor in another attribute value block 610. A third attribute value block 610 identifies his role in the movie as "Austin Powers." In this example, the preference rating block 612 that corresponds to the attribute value block 610 showing the actor's name contains a preference rating of "+4," which indicates that the user likes programs in which "Mike Myers" appears. No preference rating is shown for "Actor" and "Austin Powers."

Another attribute value block 610 identifies "Elizabeth Hurley" as being associated with the movie. Further information in other attribute value blocks 610 show that Ms. Hurley is an "Actor" in the movie and her character's name is "Miss Vanessa Kensington." A preference rating block 612 associated with "Elizabeth Hurley" indicates that the user strongly likes any program in which Ms. Hurley appears.

Another attribute value block 610 identifies "Michael York" as being associated with the movie. Further information in other attribute value blocks 610 show that Mr. York is an "Actor" in the movie and his character's name is "Basil Exposition." A preference rating block 612 associated with "Michael York" shows a value of "FT," which indicates that the attribute value of "Michael York" must be combined with at least one other attribute value that has an "FT" value shown in a corresponding preference rating block 612.

In the present example, the genre preference value 624 of "Comedy" is associated with a preference rating block 612 that shows a value of "FT." This indicates that the user prefers programs in which Michael York appears, but only if the program is also a comedy. A drama program in which Michael York appears would not be identified by the matching engine 136 as a match for this particular user.

The filter token preference rating 646 for the combination of "Michael York" and "Comedy" is a "+3." The matching engine 136 will use this value of "+3" together with the higher significance value of either "actor" or "genre" for purposes of scoring the program.

Another attribute value block 610 identifies "Jay Roach" as being associated with the movie. Further information in other attribute value blocks 610 show that Mr. Roach's function related to the movie is as "Director" of the movie. A preference rating block 612 associated with "Jay Roach" indicates that the user has no preference either positively or negatively for this particular director.

The date 618 of the movie is shown as being "1997," the year in which the movie was released. The length 620 of the movie is indicated to be one hour and 34 minutes. The user has not indicated a preference for either of these attribute values.

The genre block 622 includes preference ratings for several genre attribute values 624 associated with the movie. The genre attribute value of "Action" includes a genre rating in the genre rating block 626 of "10," which indicates that the movie can be at least partially considered to be an action movie (in this case, ten percent). The movie also displays the following genre ratings for the genre attribute value 624 shown: "Comedy" "60"; "Romance" "20"; "Science Fiction" "5"; "Medical" "1"; and "Musical" "4." As previously discussed, the genre attribute value 624 of "Comedy" has a preference rating (as shown in the preference rating block 612 associated therewith) of "FT."

The intent block 628 shows that the movie is solely intended as entertainment value by having a value of "100" entered in the intent rating block 632 that corresponds to the intent attribute value 630 of "Entertainment." In this example, the user has not entered a preference for any of the intent attribute values 630.

The content block 634 indicates that the movie contains various degrees of adult content, language, violence and nudity. Although the ratings shown in the content rating blocks 638 could be based on a total of one hundred points—as are the genre block 622 and the intent block 628—in this example, the ratings are simply based on a scale from one (1) to three (3). An adult content rating of "3" indicates that this movie contains quite a lot of content not suitable for children. A language rating of "2" indicates that there is more bad language than average. A violence rating of "1" and a nudity rating of "1" indicate that there is only some violence and nudity contained in the movie. Although a user could enter a preference rating for any of these content attribute values 636, none are shown in the present example.

FIG. 8 thus provides an example of what a user might see upon bringing up the preference entry page 600 while browsing the EPG if the user has previously entered the preferences shown. The user is then free to enter new preference values or change the preference values previously stored. The preference values will then be used to recommend other programs to the user.

It is noted that some of the preference values are global values. For example, the preference rating of "+5" entered for "Elizabeth Hurley" is not only for the movie shown identified by the title 602, but also is for "Elizabeth Hurley" in any program. So, for instance, if the user brings up a preference entry page while a movie entitled "Bedazzled" is highlighted, an attribute value of "Elizabeth Hurley" will already show a preference rating of "+5." If the preference rating is changed on that particular preference entry page, then it will be changed on the preference entry page 600 shown in FIG. 8.

It is also noted that in a simpler implementation, the user does not have to enter specific preference ratings, but can simply click on the attribute value to assign a default score to the attribute value, such as a Boolean value of "True" if the attribute value is clicked (meaning preferred) and "False" if otherwise. Such an implementation may be used to save system resources.

Methodological Implementation: UPF Creation and Maintenance

Figure 9:
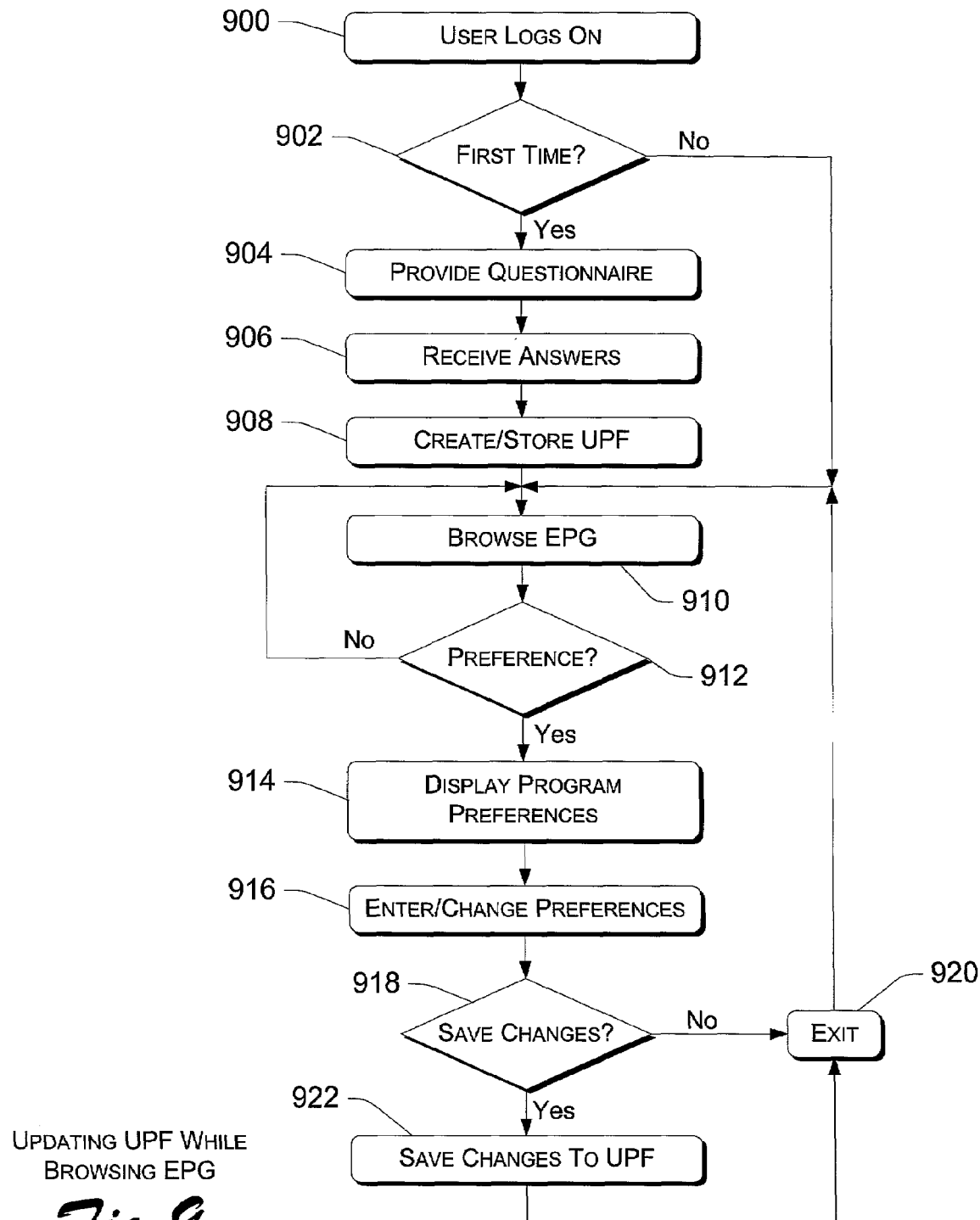
FIG. 9 is a flow diagram depicting a methodological implementation of creating a user preference file and updating the user preference file while browsing an EPG.

FIG. 9 is a flow diagram depicting a methodological implementation of creating a user preference file (UPF) and updating the UPF 126 while browsing an EPG. As used herein, updating the UPF 126 means adding or changing one or more attributes, attribute values and/or preference ratings in the UPF 126. In the following discussion, reference will be made to the elements and reference numerals included in FIG. 1. At block 900, a user logs on to a viewing system equipped with appropriate equipment for providing program recommendations to the user. If it is the user's first time to be on the system ("Yes" branch, block 902), then the user is provided a questionnaire at block 904 that requests information about program attributes and values for the attributes that the user likes or dislikes. Answers to the questionnaire are received (block 906) and are stored to create the user preference file at block 908. If it is not the user's first time to be on the system ("No" branch, block 902), then blocks 904-908 are skipped, as the user already has a UPF associated with him or her.

The user enters a browse mode on the EPG 110 at block 910. If, while browsing the EPG 110, the user wants to enter one or more preferences, the user calls up a preference entry page ("Yes" branch, block 912). As long as the preference entry page (FIG. 6, 600) is not invoked ("No" branch, block 912), the user remains on the EPG 110.

At block 914 the preference entry page 600 is displayed as previously discussed. The user makes new entries or changes existing preferences on the preference entry page 600 at block 916. If the user decides to quit the preference entry page 600 without saving any changes ("No" branch, block 918), the user exits the preference entry page at block 920. If the user decides to save the changes ("Yes" branch, block 918), then the changes are saved to the user preference file 126 before exiting the preference entry page 600 at block 920.

Methodological Implementation: Attribute Value Matching

Figure 10:
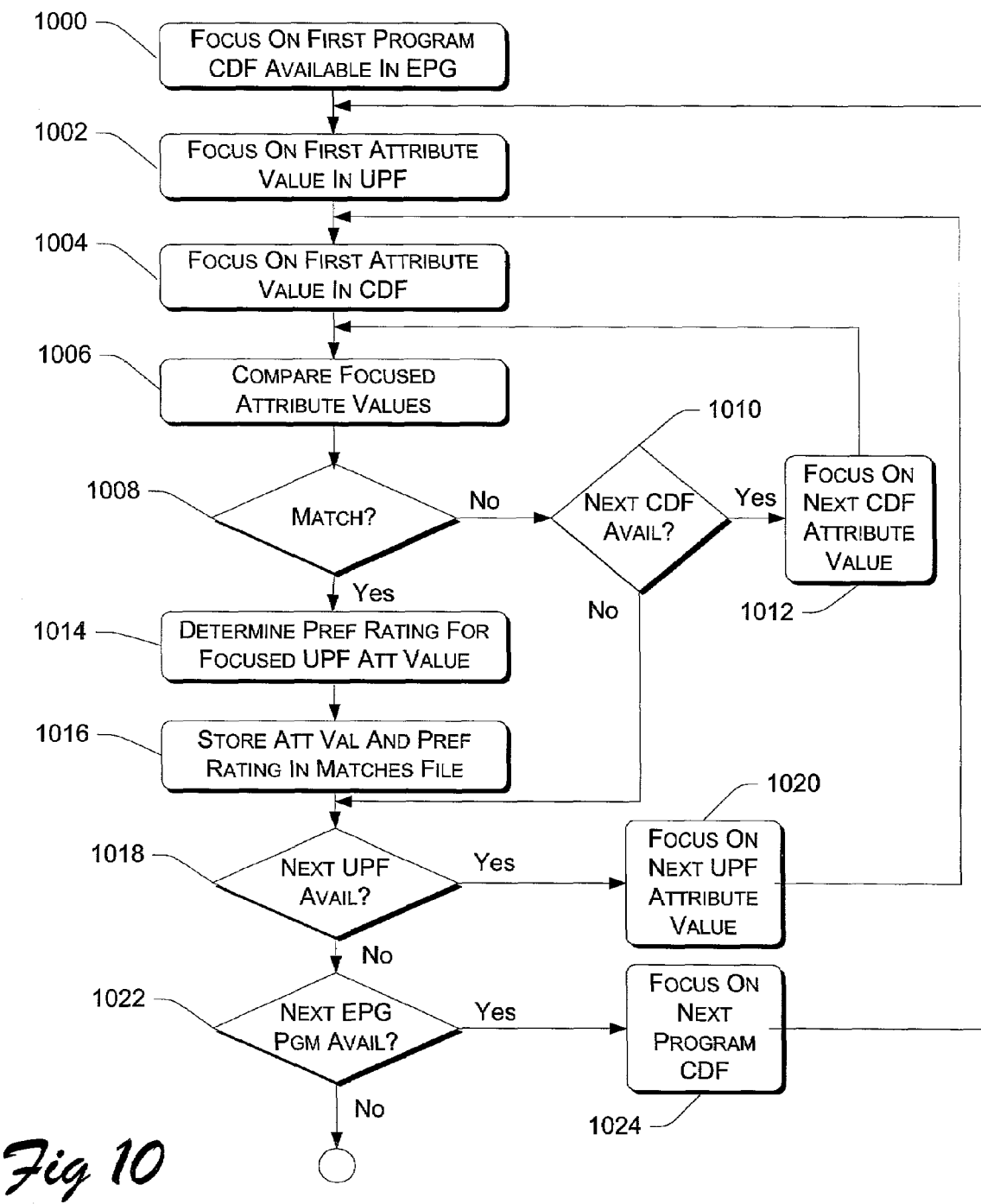
FIG. 10 is a flow diagram depicting a methodological implementation of comparing and saving matched program attributes.

FIG. 10 is a flow diagram depicting a methodological implementation of the attribute value matching process used in the implementations described herein. In the following discussion, continuing reference will be made to the elements and reference numerals shown in FIGS. 1-9.

In the previous discussion of the sample preference entry page (FIG. 8, 800) it was noted that one or more preference ratings might be displayed in the preference rating blocks 612 associated with one or more attribute value blocks 610 when the preference entry page 800 is invoked by a user. Since there may be several thousand programs and, thus, several thousand content description files available, it is probably not feasible to attempt to determine attribute value matches and associated preference ratings each time the preference entry page 800 is invoked.

To make this process more manageable, the matches file 140 is maintained and utilized for this purpose. As previously stated, the matches file 140 includes one or more attribute values found in both the UPF 126 and the CDF 122. Associated with each attribute value in the matches file 140 is a preference rating that a user has entered for that particular attribute value.

The matching engine 136 builds and maintains the matches file 140 by executing at some off-peak time—such as four in the morning—to identify and store matching attribute values and their associated preference ratings. FIG. 10 explains one implementation of this process in greater detail.

At block 1000, the matching engine 136 focuses on a CDF 126 associated with a first program available in the EPG 110. The matching engine then 136 focuses on a first attribute value in the UPF 126 (block 1002) and a first attribute value in the CDF 126 (block 1004). The matching engine compares the focused attribute values to determine if there is a match. For some types of attribute values, a complete match is required. For others, such as the detailed description 606 and the synopsis 604, at least a substantial portion of the attribute values must match.

If the focused attribute values do not match ("No" branch, block 1008), then it is determined if there is a next attribute value in the CDF 122 that is available for comparison with the focused attribute value in the UPF 122 (block 1010). If so, ("Yes" branch, block 1010), then the matching engine focuses on the next CDF attribute value (block 1012) and reverts to the compare step at block 1006.

If the focused attribute values match ("Yes" branch, block 1008), then the matching engine 136 determines a preference rating, if any, that the user associated with the UPF 126 has entered for the matching attribute value (block 1014). Once the preference rating is identified, the attribute value (e.g., "Steve Martin") is stored in the matches file 140 together with the preference rating (e.g., "+5) at block 1016. The preference rating is associated with the attribute value.

After a match has been found and recorded for a UPF attribute value (block 1016) or if no match for a UPF attribute value has been located after comparing the UPF attribute value with all CDF available attribute values ("No" branch, block 1010), then the matching engine 136 determines if there is another UPF attribute value available for comparison with the CDF 122 (block 1018). If another attribute value is available in the UPF 126 ("Yes" branch, block 1018), then the matching engine 136 focuses on the next UPF attribute value (block 1020) and the process reverts to block 1004, where the matching engine 136 focuses on the first attribute value in the CDF 122. The comparison process is then repeated with the newly focused UPF attribute value.

If there is not another attribute value in the UPF 126 that is available for comparison with the CDF 126 ("No" branch, block 1018), then at block 1004, the matching engine 136 determines if there is another program available in the EPG for the matching process (i.e., there is at least one more program for which the UPF 126 has not been compared to the program's CDF). If not ("No" branch, block 1022), then the process terminates. If there is another program available ("Yes" branch, block 1022), then the matching engine 136 focuses on the next available program in the EPG (block 1024) and the process repeats as described above from block 1002.

When the user invokes the preference entry page 800, the preference rating blocks 612 can be populated with preference data from the matches file 140. This way, the processing-intensive matching process described in FIG. 10 does not have to be performed while the user waits to see the information on the screen.

Exemplary Computer Environment

Figure 11:
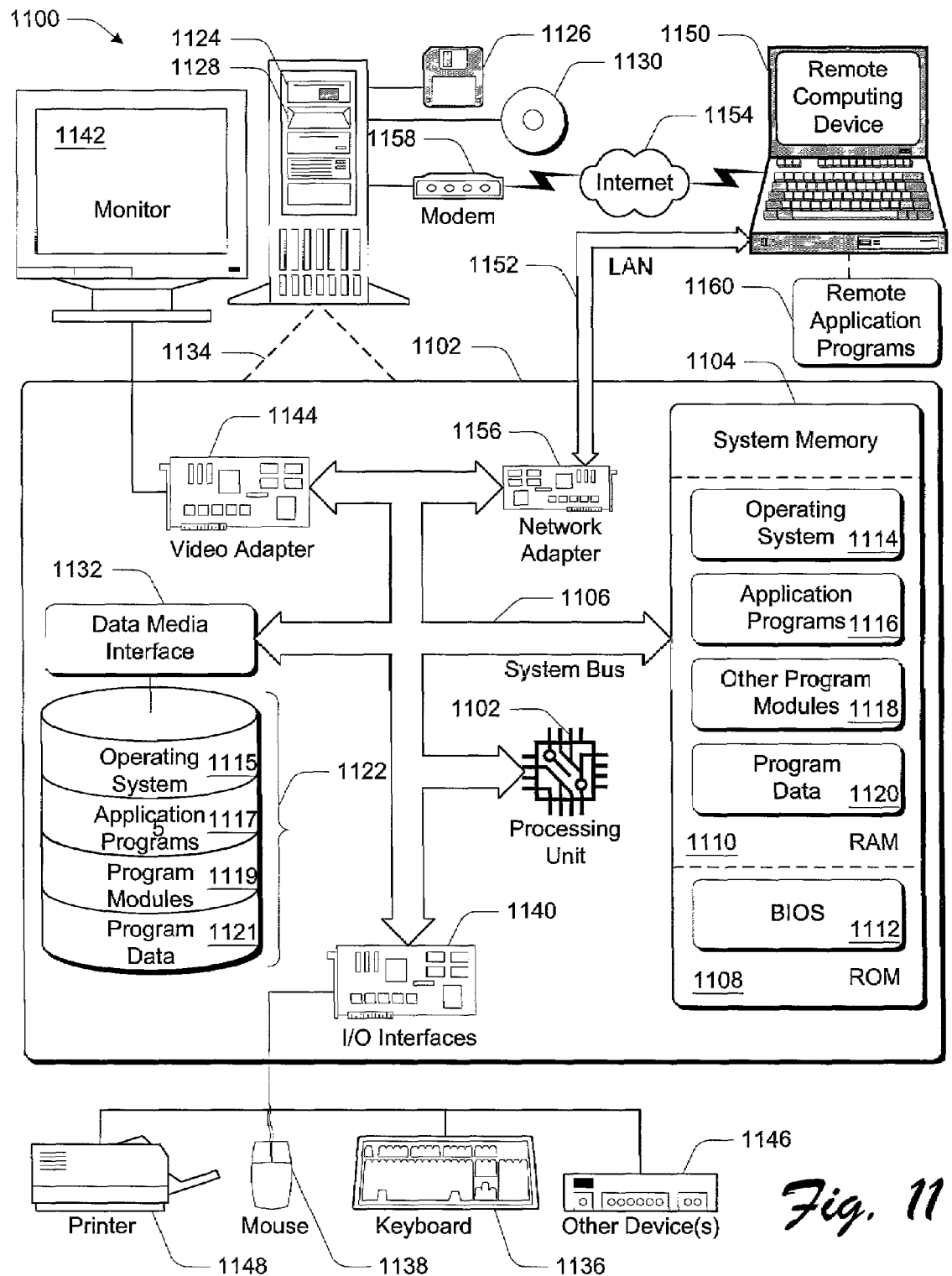
FIG. 11 is a diagram of an exemplary system on which the user preference recommendation system may be implemented.

The various components and functionality described herein are implemented with a number of individual computers. FIG. 11 shows components of typical example of such a computer, referred by to reference numeral 1100. The components shown in FIG. 11 are only examples, and are not intended to suggest any limitation as to the scope of the functionality of the invention; the invention is not necessarily dependent on the features shown in FIG. 11.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, mini-computers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 11, the components of computer 1100 may include, but are not limited to, a processing unit 1102, a system memory 1104, and a system bus 1106 that couples various system components including the system memory to the processing unit 1102. The system bus 1106 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Computer 1100 typically includes a variety of computer-readable media. Computer-readable media can be any available media that can be accessed by computer 1100 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1100. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 1104 includes computer storage media in the form of volatile and/or nonvolatile memory such as read only memory (ROM) 1108 and random access memory (RAM) 1110. A basic input/output system 1112 (BIOS), containing the basic routines that help to transfer information between elements within computer 1100, such as during start-up, is typically stored in ROM 1108. RAM 1110 typically contains data and/or program modules that are immediately accessible to and/or presently being operated on by processing unit 1102. By way of example, and not limitation, FIG. 11 illustrates operating system 1114, application programs 1116, other program modules 1118, and program data 1120.

The computer 1100 may also include other removable/non-removable, volatile/nonvolatile computer storage media. By way of example only, FIG. 11 illustrates a hard disk drive 1122 that reads from or writes to non-removable, nonvolatile magnetic media, a magnetic disk drive 1124 that reads from or writes to a removable, nonvolatile magnetic disk 1126, and an optical disk drive 1128 that reads from or writes to a removable, nonvolatile optical disk 1130 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1122 is typically connected to the system bus 1106 through a non-removable memory interface such as data media interface 1132, and magnetic disk drive 1124 and optical disk drive 1128 are typically connected to the system bus 1106 by a removable memory interface such as interface 1134.

The drives and their associated computer storage media discussed above and illustrated in FIG. 11 provide storage of computer-readable instructions, data structures, program modules, and other data for computer 1100. In FIG. 11, for example, hard disk drive 1122 is illustrated as storing operating system 1115, application programs 1117, other program modules 1119, and program data 1121. Note that these components can either be the same as or different from operating system 1114, application programs 1116, other program modules 1118, and program data 1120. Operating system 1115, application programs 1117, other program modules 1119, and program data 1121 are given different numbers here to illustrate that, at a minimum, they are different copies. A user may enter commands and information into the computer 1100 through input devices such as a keyboard 1136 and pointing device 1138, commonly referred to as a mouse, trackball, or touch pad. Other input devices (not shown) may include a microphone, joystick, game pad, satellite dish, scanner, or the like. These and other input devices are often connected to the processing unit 1102 through an input/output (I/O) interface 1140 that is coupled to the system bus, but may be connected by other interface and bus structures, such as a parallel port, game port, or a universal serial bus (USB). A monitor 1142 or other type of display device is also connected to the system bus 1106 via an interface, such as a video adapter 1144. In addition to the monitor 1142, computers may also include other peripheral output devices 1146 (e.g., speakers) and one or more printers 1148, which may be connected through the I/O interface 1140.

The computer may operate in a networked environment using logical connections to one or more remote computers, such as a remote computing device 1150. The remote computing device 1150 may be a personal computer, a server, a router, a network PC, a peer device or other common network node, and typically includes many or all of the elements described above relative to computer 1100. The logical connections depicted in FIG. 11 include a local area network (LAN) 1152 and a wide area network (WAN) 1154. Although the WAN 1154 shown in FIG. 11 is the Internet, the WAN 1154 may also include other networks. Such networking environments are commonplace in offices, enterprise-wide computer networks, intranets, and the like.

When used in a LAN networking environment, the computer 1100 is connected to the LAN 1152 through a network interface or adapter 1156. When used in a WAN networking environment, the computer 1100 typically includes a modem 1158 or other means for establishing communications over the Internet 1154. The modem 1158, which may be internal or external, may be connected to the system bus 1106 via the I/O interface 1140, or other appropriate mechanism. In a networked environment, program modules depicted relative to the computer 1100, or portions thereof, may be stored in the remote computing device 1150. By way of example, and not limitation, FIG. 11 illustrates remote application programs 1160 as residing on remote computing device 1150. It will be appreciated that the network connections shown are exemplary and other means of establishing a communications link between the computers may be used.

Conclusion

The systems and methods as described thus provide a way for a user to enter programming preferences at a time when such preferences are fresh on the user's mind. When a user is contemplating viewing a visual program or listening to an audio program, the user is in a better position to enter preferences as to why the user likes or dislikes that particular program. The user can thus enrich the user's user preference file in a convenient manner.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. A method comprising:
    displaying an electronic programming guide (EPG) user interface that includes:
        an EPG with one or more program descriptions that identify and describe multimedia programs available for viewing; and
        a selectable preference button;
    receiving an indication that the preference button has been selected via the EPG user interface;
    in response to receiving the indication that the preference button has been selected:
        identifying a currently indicated program within the EPG;
        displaying multiple program attribute values of the program in a preference entry user interface to enable entry of a preference rating that corresponds to a program attribute value of the program, the preference rating indicating a degree of like or dislike for the program attribute value, wherein entering a preference rating comprises selecting the program attribute value to indicate that the program attribute value is a preferred program attribute value;
        entering a corresponding preference rating for each of a subset of the multiple program attribute values of the program to create preferred program attribute values of the program; and
        storing the preferred program attribute values and corresponding preference ratings in a user preference file (UPF); and
    associating a numerical significance value with each stored preferred program attribute value, each numerical significance value denoting a relative importance of each stored preferred program attribute value with regard to each other stored preferred program attribute value;
    identifying each stored preferred program attribute value that matches an attribute value of an upcoming program, wherein each matching preferred program attribute value and each corresponding preference rating of each matching preferred program attribute value are associated with the upcoming program and stored in a matches file, wherein when the user invokes a preference entry user interface associated with the upcoming program, the preference ratings of the matching preferred program attribute values are populated in the preference entry user interface from the matches file;
    calculating a score for each matching preferred program attribute value stored in the matches file, the calculation of the score comprising the use of the numerical significance value and the associated preference rating of the matching preferred program attribute value;
    deriving a program score for the upcoming program based on the score for each matching preferred program attribute value; and
    determining to recommend the upcoming program based on the program score.

2. The method as recited in claim 1, wherein an absence of entering a preference rating comprises indicating that the program attribute value is not a preferred program attribute value.

3. The method as recited in claim 1, wherein entering a preference rating comprises entering a numerical value to be associated with the program attribute value, the numerical value indicating the degree of like or dislike of the program attribute value.

4. The method as recited in claim 3, wherein entering a numerical value comprises entering a numerical value in a preference rating block associated with the program attribute value.

5. The method as recited in claim 3, further comprising selecting the numerical value to be entered from a predefined list of numerical values.

6. The method as recited in claim 3, wherein the numerical value is a numerical value in a range from one to ten.

7. The method as recited in claim 3, wherein the numerical value is a numerical value in a range from negative five to positive five.

8. The method as recited in claim 1, wherein contains one or more preferred program attribute values and corresponding preference ratings associated with one or more other programs.

9. The method as recited in claim 1, wherein previously entered preference ratings for the program attribute value or one or more other program attribute values associated with the program are displayed along with program attribute values with no preference ratings entered via the preference entry user interface.

10. The method as recited in claim 1, wherein:
    the program attribute value is a first program attribute value;
    the preference rating is a first preference rating;
    displaying a preference entry user interface to enable entry of a preference rating comprises enabling entry of a second preference rating for a second program attribute value; and
    the storing comprises also storing the second program attribute value and the second preference rating.

11. The method as recited in claim 1, wherein the program attribute values and the corresponding preference ratings are associated with each other when they are stored in such a way as they can be identified together at a later time.

12. The method as recited in claim 1, wherein identifying the currently indicated program within the EPG comprises identifying a highlighted program description.

13. The method as recited in claim 1, wherein each of the one or more program descriptions comprises a title of a program.

14. The method as recited in claim 1, wherein the multimedia programs are television programs.

15. The method as recited in claim 1, wherein the multimedia programs are audio programs.

16. A system comprising:
  an electronic programming guide (EPG) that displays a selection control and partial program description of one or more selectable multimedia programs available for user access, wherein when the selection control is actuated by a user via the EPG when a program is selected, a preference entry page associated with the selected program is displayed, the preference entry page comprising:
    multiple program attribute values of the selected program, each program attribute value having an associated entry region to facilitate user entry of a corresponding preference rating; and
    a save control, that when actuated, facilitates storage of each entered preference rating and corresponding program attribute value, wherein each entered preference rating provides an indication of like or dislike for the corresponding program attribute value, wherein the entering and the storing of each preference rating indicates that the corresponding program attribute value is a preferred program attribute value; and
  a matching engine that:
    associates a numerical significance value with each preferred program attribute value, each numerical significance value denoting a relative importance of each preferred program attribute value with regard to each other preferred program attribute value;
    determines each preferred program attribute value that matches an attribute value of an upcoming program to identify one or more matching preferred program attribute values;
    populates a matches file with the one or more matching preferred program attribute values and the associated preference ratings of the one or more matching preferred program attribute values; and
    calculates a program score for the upcoming program, the calculation facilitated by the numerical significance value and the preference rating associated with each of the one or more matching preferred program attribute values.

17. The system as recited in claim 16, wherein an absence of entering and storing a preference rating for a corresponding program attribute value indicates that the corresponding program attribute value is not a preferred program attribute value.

18. The system as recited in claim 16, wherein the preference entry page further comprises a preference entry block entry region into which a numerical value can be entered to indicate a degree of like or dislike for a program attribute value associated with the preference entry block.

19. The system as recited in claim 18, further comprising a preference entry control that displays a list of predefined numerical values that may be entered into the preference entry block.

20. The system as recited in claim 18, wherein the numerical value is a numerical value in a range from a first non-negative integer to a second non-negative integer.

21. The system as recited in claim 18, wherein the numerical value is a numerical value in a range from a negative integer to a non-negative integer.

22. The system as recited in claim 16, wherein the preference entry page further comprises a detailed description of the selected program together with a preference rating entry region to facilitate entry of a preference rating for one or more words selected from the detailed description, wherein when a preference rating is entered and the save control is actuated, the one or more selected words are stored as a preferred program attribute value along with the associated entered preference rating.

23. The system as recited in claim 16, wherein the preference entry page further comprises a genre block that includes one or more genre attribute values associated with the selected program.

24. The system as recited in claim 16, wherein the preference entry page further comprises a content block that includes one or more content attribute values associated with the selected program.

25. The system as recited in claim 16, wherein the preference entry page further comprises an intent block that includes one or more intent attribute values associated with the selected program.

26. The system as recited in claim 16, wherein the preference entry page displays one or more previously saved preference ratings when the preference entry page is invoked.

27. The system as recited in claim 16, wherein one or more preference ratings may be entered for one or more respective program attribute values.

28. The system as recited in claim 16, wherein the preference entry page further comprises the save control as a preference button that, when actuated, saves changed preference ratings to a user preference file.

29. The system as recited in claim 16, further comprising a highlighter module configured to highlight any one of the partial program descriptions, and wherein the program selected from the EPG is determined to be a program that corresponds to a highlighted program description.

30. The system as recited in claim 16, wherein the partial program descriptions further comprise at least a portion of a title of the programs associated with the partial program descriptions.

31. One or more computer storage media comprising instructions that, when executed, direct a computing device to perform a method, the method comprising:
  invoking a preference entry page, wherein the preference entry page comprises:
    at least one program attribute value associated with a program identified in an electronic programming guide (EPG);
    a preference rating area associated with each program attribute value through which a preference rating may be indicated, the preference rating indicating a user like or dislike for the program attribute value associated with the preference rating area, wherein the preference entry page associated with the program is invoked by the user from the EPG; and
    a save control, that when actuated, facilitates storage of each indicated preference rating and corresponding program attribute value, wherein entering and storing the preference rating indicates that the program attribute value associated with the preference rating is a preferred program attribute value; and associating a numerical significance value with each preferred program attribute value, each numerical significance value denoting a relative importance of each preferred program attribute value with regard to each other preferred program attribute value, wherein for each preferred program attribute value that matches an attribute value of an upcoming program, the associated numerical significance value and the associated preference rating facilitate calculation of a program score for the upcoming program.

32. The one or more computer storage media as recited in claim 31, wherein an absence of entering and storing a preference rating indicates that the program attribute value associated with the preference rating is not a preferred program attribute value.

33. The one or more computer storage media as recited in claim 31, wherein the preference rating area comprises a preference rating block into which a rating value is entered to indicate a degree of like or dislike for the program attribute value associated with the preference rating block.

34. The one or more computer storage media as recited in claim 31, wherein the preference rating area comprises a preference entry control that displays one or more preference ratings that may be entered into the preference rating area.

35. The one or more computer storage media as recited in claim 31, wherein the preference rating comprises a numerical value in a range from a first non-negative integer to a second non-negative integer.

36. The one or more computer storage media as recited in claim 31, wherein the preference rating comprises a numerical value in a range from a negative integer to a positive integer.

37. The one or more computer storage media as recited in claim 31, wherein the preference entry page further comprises a genre block that includes one or more genre attribute values associated with the program that can be preference rated.

38. The one or more computer storage media as recited in claim 31, wherein the preference entry page further comprises an intent block that includes one or more intent attribute values associated with the program that can be preference rated.

39. The one or more computer storage media as recited in claim 31, wherein the preference entry page further comprises a content block that includes one or more content attribute values associated with the program that can be preference rated.

40. One or more computer storage media containing computer-executable instructions that, when executed on a computer, perform a method, the method comprising:
   displaying an electronic programming guide (EPG);
   receiving a selection of a user preference command wherein the user preference command is invoked from the EPG;
   determining a currently selected program in the EPG;
   displaying one or more program attribute values associated with the currently selected program;
   displaying a preference rating object for each of the displayed program attribute values;
   receiving a preference rating from at least one of the preference rating objects;
   storing the received preference rating and the program attribute value associated with the preference rating object that is associated with the received preference rating in a user preference file (UPF); and
   associating a numerical significance value with each stored program attribute value, the numerical significance value denoting a relative importance of each stored program attribute value with regard to each other stored program attribute value, wherein for each stored program attribute value that matches an attribute value of an upcoming program, the associated numerical significance value and the associated preference rating are used to calculate a program score for the upcoming program.

41. The one or more computer storage media as recited in claim 40, wherein displaying the EPG comprises displaying at least a partial description for one or more programs that are available for user access.

42. The one or more computer storage media as recited in claim 40, wherein displaying the preference rating object comprises displaying a selectable preference rating object that, when selected, identifies the program attribute value associated with the preference rating object as a preferred program attribute value.

43. The one or more computer storage media as recited in claim 40, wherein displaying the preference rating object comprises displaying a preference rating block into which a preference rating may be entered, the preference rating indicating a degree of like or dislike for the program associated with the preference rating block.

44. The one or more computer storage media as recited in claim 40, the method further comprising displaying a preference rating control that displays one or more selectable preference ratings that may be selected for entry via the preference rating object.

45. The one or more computer storage media as recited in claim 40, the method further comprising displaying one or more previously saved preference ratings from the UPF.

46. The one or more computer storage media as recited in claim 40, wherein the preference rating is a numerical value between a first non-negative integer and a second non-negative integer.

47. The one or more computer storage media as recited in claim 40, wherein the preference rating is a numerical value between a negative integer and a positive integer.

48. The one or more computer storage media as recited in claim 40, wherein the program is a television program.

49. The one or more computer storage media as recited in claim 40, wherein the program is an audio program.

50. The one or more computer storage media as recited in claim 40, the method further comprising displaying a preference actuator and only performing the storing if the preference actuator is actuated.

51. The one or more computer storage media as recited in claim 40, the method further comprising displaying an exit actuator, discarding the received preference rating and foregoing the storing if the exit actuator is actuated.

* * * * *